United States Patent [19]

Maeda et al.

[11] Patent Number: 5,369,569
[45] Date of Patent: Nov. 29, 1994

[54] SYSTEM FOR RESTORING CONTROLLED UNIT FROM ABNORMAL CONDITION

[75] Inventors: Noboru Maeda, Chiryu; Tatsuo Miura, Kariya; Haruo Murakami, Nishio, all of Japan

[73] Assignee: Nippondenso Co., Ltd., Kariya, Japan

[21] Appl. No.: 975,330

[22] Filed: Nov. 16, 1992

[30] Foreign Application Priority Data

Nov. 14, 1991 [JP] Japan ................ 3-299126

[51] Int. Cl.⁵ .............................. G06F 15/46
[52] U.S. Cl. .................. 364/184; 364/551.01
[58] Field of Search ............. 364/184, 185, 186, 187, 364/468, 550, 551.01, 551.02, 478; 395/903, 904, 905, 906, 912, 913, 914, 915, 68, 75; 371/29.1

[56] References Cited

U.S. PATENT DOCUMENTS

| | | | |
|---|---|---|---|
| 4,697,243 | 9/1987 | Moore et al. | 364/184 X |
| 4,967,337 | 10/1990 | English et al. | 364/184 |
| 5,081,598 | 1/1992 | Bellows et al. | 364/186 X |
| 5,111,383 | 5/1992 | Kimura et al. | 364/184 |
| 5,195,029 | 3/1993 | Murai et al. | 364/184 |
| 5,247,447 | 9/1993 | Korncoff et al. | 364/185 X |

FOREIGN PATENT DOCUMENTS 1248206 10/1989 Japan .
152762 11/1989 Japan .
3230202 10/1991 Japan .

*Primary Examiner*—Joseph Ruggiero
*Attorney, Agent, or Firm*—Cushman, Darby & Cushman

[57] ABSTRACT

In a system for restoring a controlled unit from an abnormal condition, a plurality of predicted abnormal conditions and corresponding restoring procedures are prestored. When an actually generated abnormal condition matches with one of the prestored abnormal conditions, the system restores the controlled unit from the abnormal condition based on the prestored restoring procedure corresponding to the abnormal condition which matches with the actually generated abnormal condition.

10 Claims, 28 Drawing Sheets

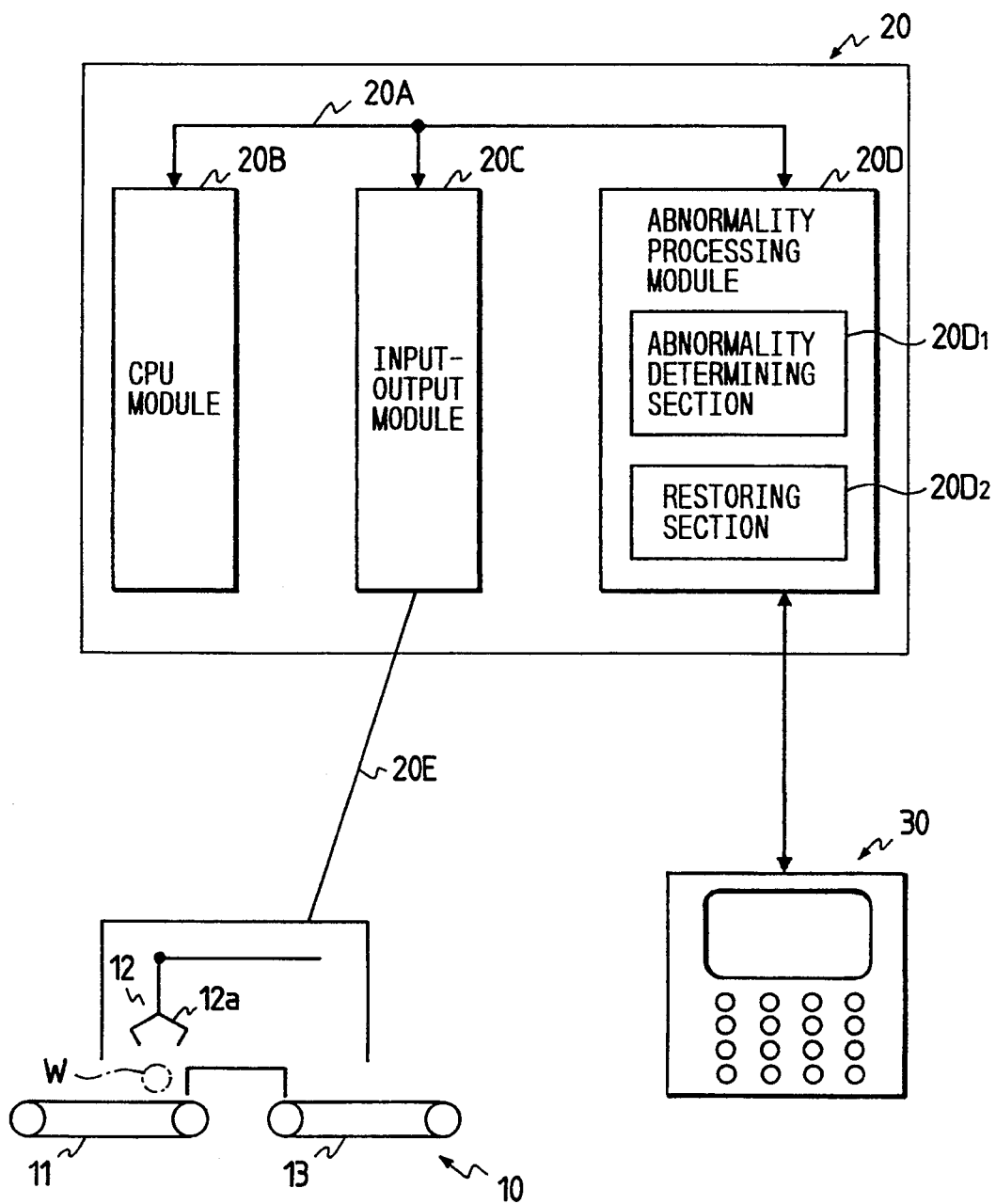

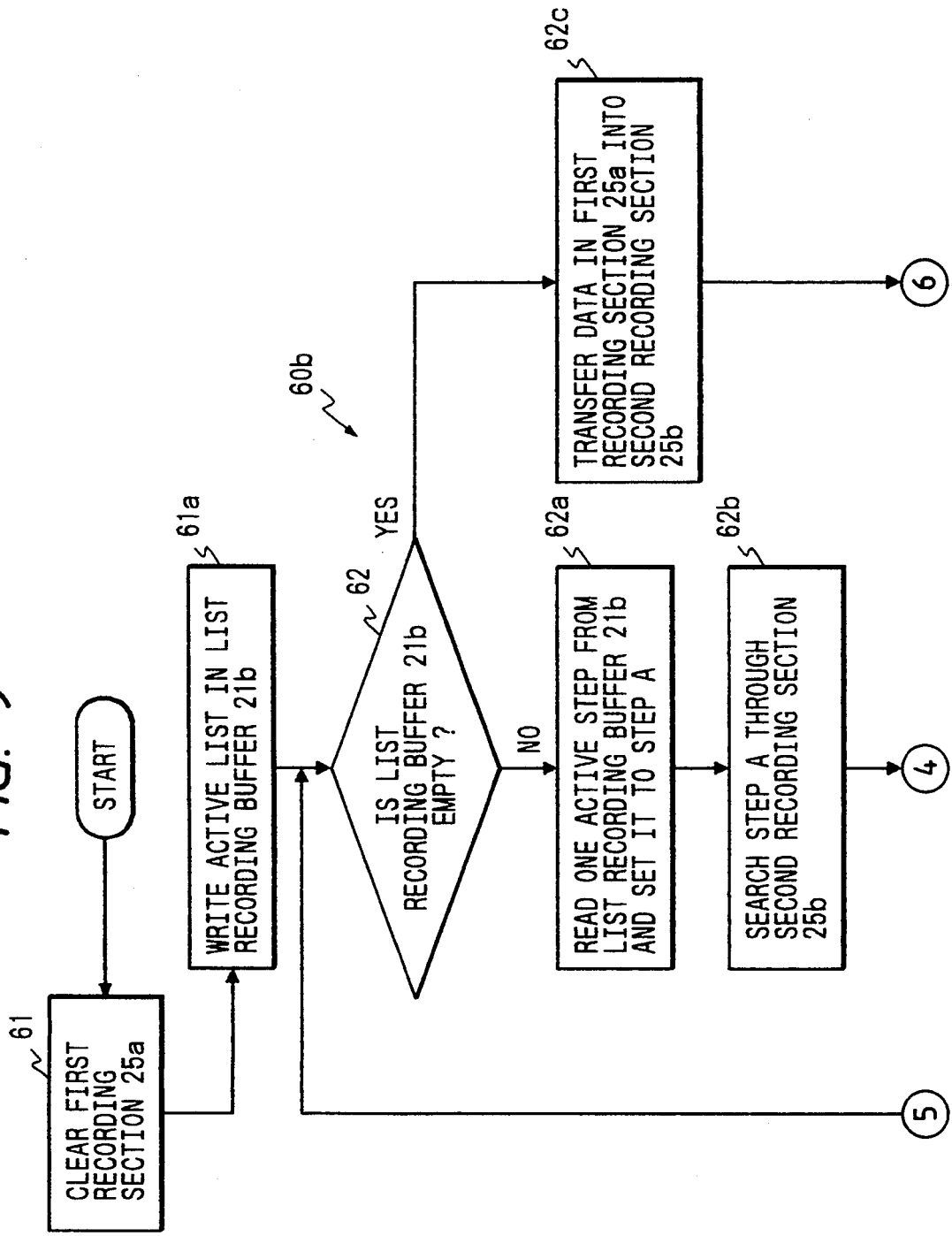

SYSTEM FOR RESTORING CONTROLLED UNIT FROM ABNORMAL CONDITION

BACKGROUND OF THE INVENTION

1. Field of the Invention

The present invention relates generally to a system for restoring a controlled unit from an abnormal condition. More specifically, the present invention relates to a system for controlling operations of a controlled actuating unit, wherein the operations of the controlled actuating unit are monitored and diagnosed, and further restored when abnormality is detected. The present invention is particularly applicable to the sequence control of the actuating unit performed by a sequence controller including a programmable controller, a relay circuit, a robot controller and a numeric controller.

2. Description of the Prior Art

Various diagnostic systems for controlled actuating units are known as disclosed in references such as Japanese First (unexamined) Patent Publication No. 1-48206 and Japanese Second (examined) Patent Publication No. 1-52762.

Japanese First Patent Publication No. 1-248206 discloses a programmable controller. A sequence program to be executed by the controller is formed by a plurality of routines, each having sequence steps. A timer is provided for checking whether the routine proceeds from one step to a next step within a preset maximum time. An abnormal condition is determined when the timer counts up the preset maximum time. When the abnormal condition is determined, all transition conditions necessary for proceeding to the next step with an indication of the unsatisfied transition condition are stored in a data memory, which can be displayed on a display screen.

Japanese Second Patent Publication No. 1-52762 discloses a programmable controller including a calculation mode and a run mode. In the calculation mode, maximum and minimum ON times or OFF times of each output relay are derived by operating a controlled unit. In the run mode, ON times or OFF times of each output relay are derived by actually operating the controlled unit, and an abnormal condition is determined when the derived ON time or OFF time of each output relay exceeds the corresponding maximum or minimum ON or OFF time.

However, though the occurrence of the abnormality can be known in both publications and all the transition conditions with the unsatisfied transition condition can be known in Japanese First Patent Publication No. 1-248206, the restoring operation for all abnormal conditions should be manually performed by the operator. This is troublesome to the operator and deteriorates the operation efficiency.

Further, when a new abnormal condition which is not predictable beforehand occurs, since no indication of a required transition condition can be shown to the operator, it is difficult for normal operators to deal with that abnormality. Specifically, after a well experienced operator has manually restored the system from the particular new abnormality with his own knowledge, no other operators can share what the well experienced operator has learned. Further, if such abnormality occurs repeatedly, the well experienced operator has to perform the same or similar manual operations repeatedly. This possibly deteriorates the operation efficiency.

On the other hand, though it is theoretically possible to include all predictable abnormal conditions, i.e. all predictable transition conditions in the sequence program, such an inclusion requires a great deal of efforts and is not practical. In practice, the abnormality is so irregular that it is extremely difficult to make the sequence program for predicting all possible abnormal conditions. Further, since abnormal conditions actually generated form only a part, dealing with all predictable abnormality is not practical, but is wasteful.

SUMMARY OF THE INVENTION

Therefore, it is an object of the present invention to provide an improved system for restoring a controlled unit from abnormality that can eliminate at least one of the above-noted defects inherent in the prior art.

To accomplish the above-mentioned and other objects, according to one aspect of the present invention, a system for restoring a controlled unit from an abnormal condition comprises storing means for storing a plurality of abnormal conditions of the controlled unit and corresponding restoring procedures; determining means for determining whether an actually generated abnormal condition matches with one of the stored abnormal conditions; and restoring means for restoring the controlled unit from the abnormal condition based on the stored restoring procedure corresponding to the one of the stored abnormal conditions when the determining means determines that the actually generated abnormal condition matches with the one of the stored abnormal conditions.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 1 is a block diagram showing a first preferred embodiment of the present invention;

FIGS. 9 and 10 show a flowchart of an abnormality determining routine;

DESCRIPTION OF THE PREFERRED EMBODIMENT

Figure 2A:
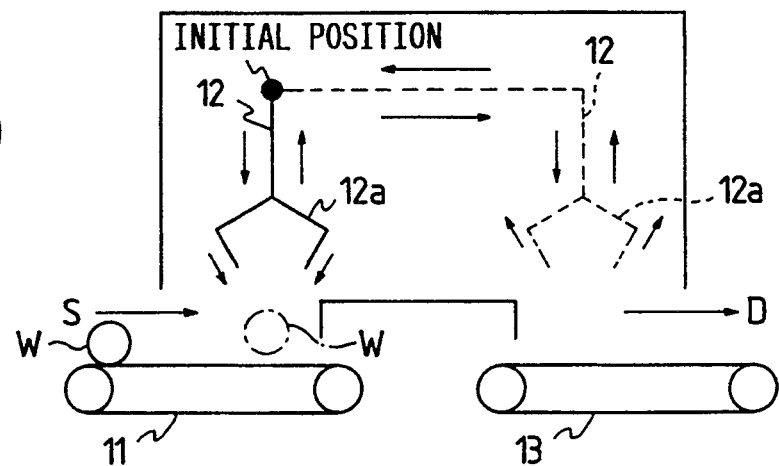
FIG. 2(A) is a diagram for explaining operations of a loader unit.

Referring now to the drawings, a first preferred embodiment of the present invention will be described with reference to FIGS. 1 to 21.

In the first preferred embodiment, the present invention is applied to a control system for a loader unit. In FIG. 1, the loader unit 10 includes as main components a conveyer 11, a loader 12 with a hand 12a, a conveyer 13, various actuators (not shown) such as motors and cylinders for operating the conveyers 11, 13 and the loader 12, and a plurality of position sensors LS1 to LS6 and PH0 to PH2 (FIG. 2(B)) for detecting operating positions of the conveyers 11, 13 and the loader 12.

In FIG. 2(A), the conveyer 11 receives a work piece W at a position identified by a solid line and carries same forward (rightward in FIG. 2A) as indicated by an arrow S. The loader 12 is lowered from an initial position identified by a solid line to chuck or grasp the work piece W with hand 12a at a position identified by a dotted line which is located right under the hand 12a. Thereafter, the loader 12 returns to the initial position and then advances to a forward end of its stroke identified by a dotted line. At this forward stroke end, the loader 12 is again lowered and allows the hand 12a to unchuck or release the work piece W onto the conveyer 13. Subsequently, the loader 12 is raised and moved backward so as to return to the initial position. The conveyer 13 carries the unchucked work piece W in a direction D for discharging the same.

Figure 2B:
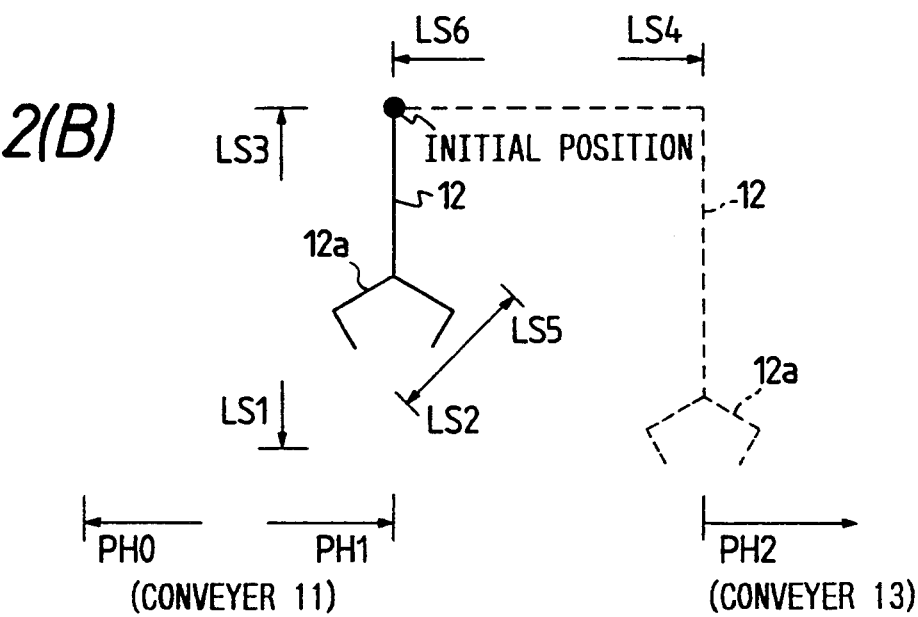
FIG. 2(B) is a diagram showing an arrangement of position sensors.

In FIG. 2(B), the position sensor LS1 detects when the loader 12 completes its downward movement to a lowermost point. The position sensor LS2 detects when the hand 12a completes its chucking operation and the position sensor LS5 detects when the hand 12a completes its unchucking operation. The position sensor LS3 detects when the loader 12 completes its upward movement from its lowermost point. The position sensor LS4 detects when the loader 12 completes its forward movement to the forward end from the initial position. The position sensor LS6 detects when the loader 12 completes its backward movement to the initial position from its forward end. The position sensor PH0 detects when the conveyer 11 receives the work piece W. The position sensor PH1 detects when the conveyer 11 carries the work piece W to the position as identified by the dotted line in FIG. 2(A), that is, where the work piece W is chucked by the hand 12a. The position sensor PH2 is set ON to detect when the conveyer 13 receives the unchucked work piece W, while getting set OFF when the conveyer 13 carries the work piece W to a work piece discharging point. Each of these sensors is formed by a normally-open limit switch.

As shown in FIG. 1, the control system includes a programmable controller 20 (hereinafter referred to as "PC 20") which executes operations based on a stored sequential function chart (hereinafter referred to as "SFC"), and a control panel 30. The PC 20 includes a CPU module 20B, an input-output module 20C and an abnormality processing module 20D, which are interconnected via a bus 20A.

Figure 3:
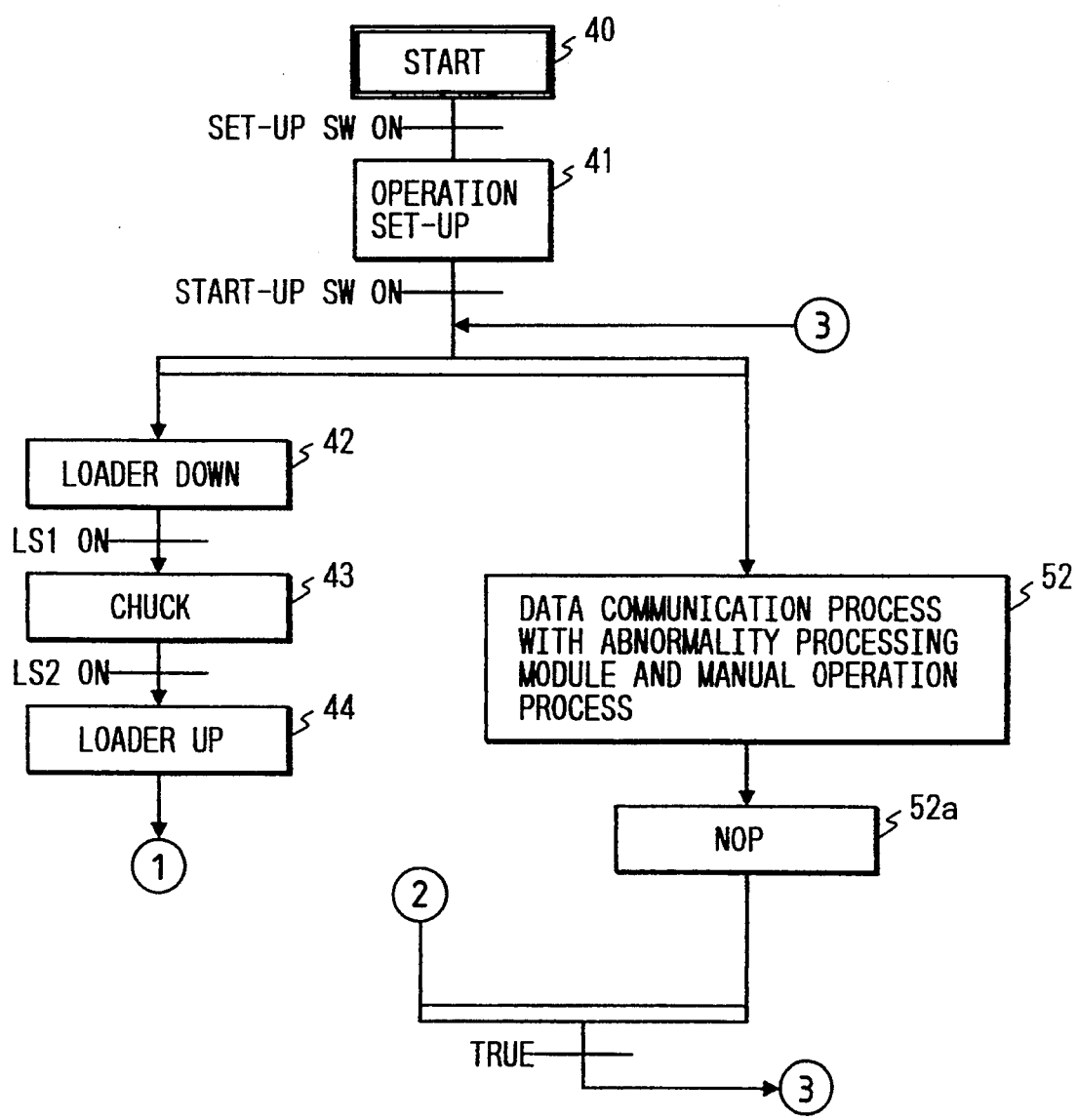
FIGS. 3 and 4 show a sequential function chart representing operations of a CPU module shown in FIG. 1.
Figure 4:
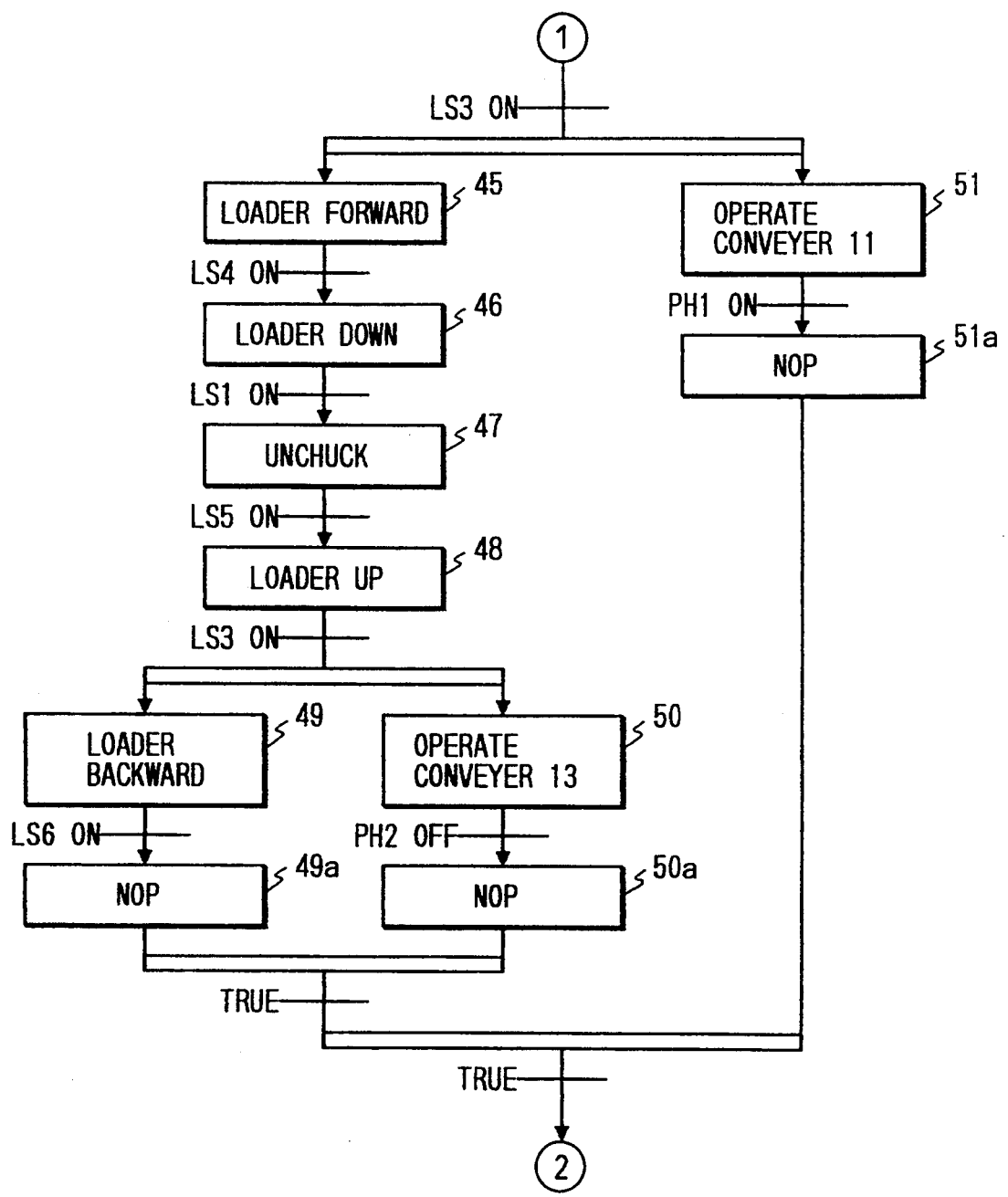

The CPU module 20B is a control execution section of the PC 20 and executes a unit operating program according to the SFC shown in FIGS. 3 and 4. During the execution, the CPU module 20B sends instructions to the input-output module 20C via the bus 20A to receive data from the foregoing position sensors of the loader unit 10 via a bus 20E for processing so as to control the operations of the loader unit 10 via the bus 20E. The CPU module 20B further performs communications with the abnormality processing module 20D for transmitting and receiving data therebetween.

The unit operating program is prestored in an internal memory of the CPU module 20B and includes an automatic operation mode and a manual operation mode. In the automatic operation mode, the operations of the loader unit 10 are automatically controlled according to stored sequence steps, while in the manual operation mode, the loader unit 10 is operated according to steps corresponding to respective manual inputs from an operator through the control panel 30. These steps of the unit operating program are shown in FIGS. 3 and 4. As will be described later in detail, steps 40 and 41 execute an initialization of the program and the loader unit 10, steps 42 to 51 execute the operation control of the loader unit 10 during the automatic operation mode, and a step 52 executes data communications with the abnormality processing module 20D and the operation control of the loader unit 10 during the manual operation mode.

In the first preferred embodiment, an occurrence of abnormality or malfunction is determined when an execution time of each SFC step exceeds a preset maximum time. The maximum time is predetermined by predicting a normally required time for executing each SFC step. Table 1 shows this maximum time for each SFC step as an example. In Table 1, those steps with no indication of the maximum time have no time limit for execution thereof. The data as shown in Table 1 is prestored in a maximum time recording section 22a (FIG. 6) of the abnormality processing module 20D, which will be described later.

TABLE 1

| STEP | MAXIMUM TIME (SEC) |
| --- | --- |
| 41 | |

TABLE 1-continued

| STEP | MAXIMUM TIME (SEC) |
| --- | --- |
| 42 | 1 |
| 43 | 1 |
| 44 | 1 |
| 45 | 1 |
| 46 | 1 |
| 47 | 1 |
| 48 | 1 |
| 49 | 1 |
| 49a | |
| 50 | 3 |
| 50a | |
| 51 | 3 |
| 51a | |

A portion of the internal memory of the CPU module 20B is used as a buffer for storing a step number of the unit operating program in a sequential order. In this case, the buffer must have a capacity for storing numbers of all the steps which become active simultaneously or in parallel during the execution of the unit operating program. For example, in the SFC of FIGS. 3 and 4, since the number of the active steps becomes maximum when the steps 49, 50 and 51 are simultaneously executed, the capacity of the buffer is set to "3". For locating the step number to be temporarily stored in the buffer, the CPU module 20B performs a scanning action per unit time through the unit operating program. In case the PC 20 is of a type in which the CPU module 20B is capable of automatically allocating the step numbers which are read out by a built-in program, this function of the PC 20 is utilized. On the other hand, in case of the PC 20 having no such a function, the step numbers assigned in serial by a programmer are to be used. As a result, a list of the active step is recorded in the buffer each time the unit operating program is scanned by the CPU module 20B. For example, when the steps 49, 50 and 51 are simultaneously active during a particular scan, the buffer list shows (49, 50, 51).

At the step 52 in FIG. 3, the list of the active step stored in the buffer is transferred to the abnormality processing module 20D each time one scan of the unit operating program during the automatic operation mode is finished. In case the PC 20 is of a type capable of setting a program area which is constantly active irrespective of the execution of the unit operating program, the program for transmitting the list of the active step may be stored in this program area. This program area means, for example, main sequence program of MELSEC-A series (MELSAP-II PROGRAMMING MANUAL P1-5, OCTOBER 1990, MITSUBISHI ELECTRIC CORP.) or MCP of PLC-5 series (PLC-5 PROGRAMMING SOFTWARE, PROGRAMMING-PROGRAMMING CONSIDERATIONS P2-1, FEBRUARY 1991, ALLENN-BRADLEY).

After the list of active steps is transferred to the abnormality processing module 20D, the buffer is reset to clear its content.

The step 52 includes a further routine for manually operating the loader unit 10 by the manual operation of the control panel 30. This manual operation routine is activated only when a signal for the manual operation mode is input via the control panel 30. In case the PC 20 has the above-noted program area, this manual operation routine may also be stored in such a program area in addition to the program for transmitting the active step list so that the step 52 may be omitted.

Figure 5:
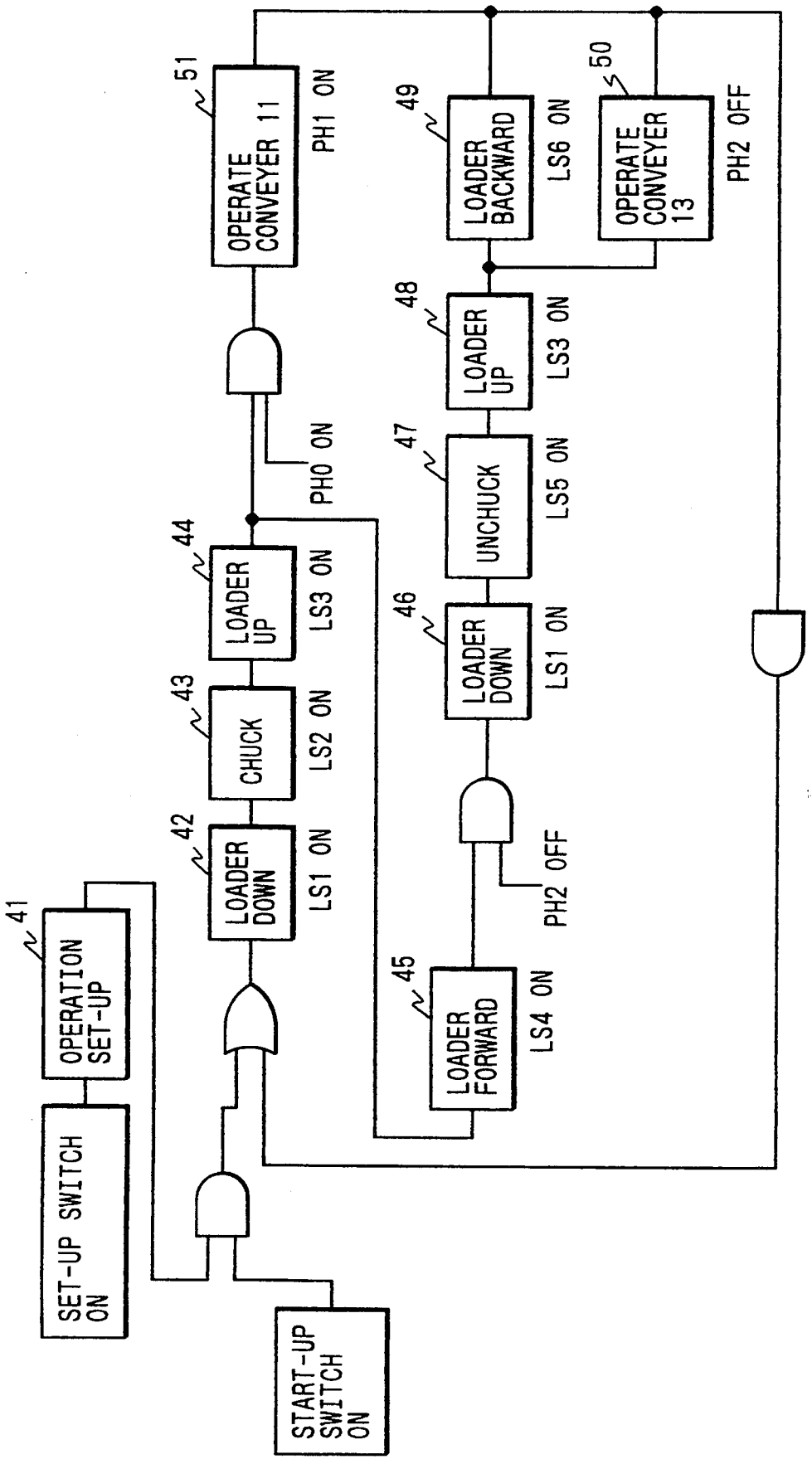
FIG. 5 is a diagram for explaining operations of the loader unit.

Now, the operations of the CPU module 20B will be described with reference to the SFC (unit operating program) shown in FIGS. 3 and 4 as well as an operation diagram shown in FIG. 5.

The unit operation program is started at the step 40 in FIG. 3. When an operation set-up switch (not shown) of PC 20 is closed, an operation set-up process is executed at a step 41. This operation set-up process includes an operation set-up of the loader unit 10 and a setting of the first work piece W right under the initial position of the loader 12 on the conveyer 11. This process is called an initial setting of the loader unit 10. Subsequently, when a start-up switch (not shown) of the PC 20 is closed, the program proceeds to the steps 42 and 52 in parallel. In FIGS. 3 and 4, a signal TRUE + represents that a transition condition is established for proceeding to the subsequent process of the program.

At the step 42, the loader 12 is lowered from the initial position, while at a step 52, the CPU module 20B executes data communications with the input-output module 20C and the abnormality processing module 20D. The data communications include a transmission of the active step list to the abnormality processing module 20D. When the position sensor LS1 detects the completion of the downward movement of the loader 12, the hand 12a of the loader 12 chucks the work piece W at the step 43. Subsequently, when the position sensor LS2 detects the chucking of the work piece W by the hand 12a, the loader 12 is lifted at the step 44.

Referring now to FIG. 4, when the position sensor LS3 detects the completion of the upward movement of the loader 12, the program proceeds to the steps 45 and 51 in parallel. At the step 45, the loader 12 is advanced forward, while at the step 51, the conveyer 11 is operated to move the next work piece W to the position right under the initial position. Accordingly, it should be conditioned that when the conveyer 11 is operated at the step 51, the conveyer 11 has received the work piece W, i.e. the position sensor PH0 is set ON.

Subsequently, when the position sensor LS4 detects the completion of the forward movement of the loader 12, the loader 12 is lowered at the step 46. When the position sensor LS1 detects the completion of the downward movement of the loader 12, the hand 12a of the loader 12 unchucks or releases the work piece W onto the conveyer 13 at the step 47. When the position sensor LS5 detects the unchucking of the work piece W by the hand 12a, the loader 12 is lifted at the step 48. When the position sensor LS3 detects the completion of the upward movement of the loader 12, the program proceeds to the steps 49 and 50 in parallel.

Referring back to the step 51, when the position sensor PH1 detects the work piece W on the conveyer 11 during the execution of the step 51, a waiting process (hereinafter referred to as "NOP") is executed at the step 51a. The NOP at the step 51a means that the program waits at the step 51a until the parallel processing proceeds to the steps 49a and 50a via the steps 49 and 50.

At the step 49, the loader 12 is moved backward, while the conveyer 13 is operated at the step 50 to carry the work piece W thereon to the work piece discharging point. When the position sensor LS6 detects the completion of the backward movement of the loader 12, the program advances to the step 49a where the NOP is executed. When the position sensor PH2 detects the work piece at the work piece discharging point, the program goes to the step 50a where the NOP is executed. When the execution of the NOP's at the steps 49a, 50a and 51a as well as the execution of the NOP at the step 52a via the step 52 are finished, the program returns to the parallel processing at the steps 42 and 52 so as to repeat the above described processing to control the operations of the loader unit 10.

Figure 8A:
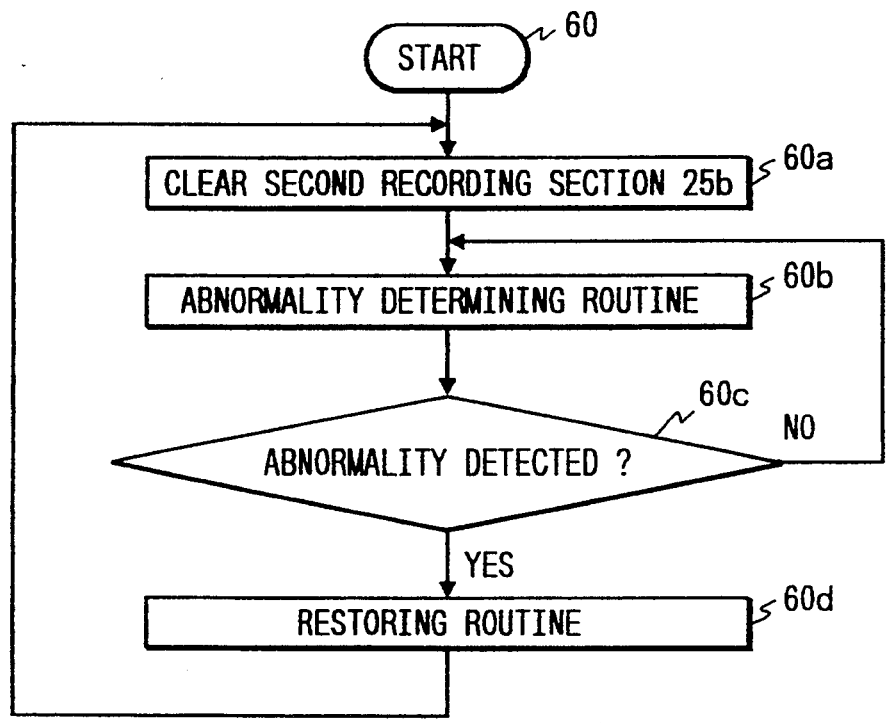
FIG. 8(A) is a flowchart showing an abnormality determining and restoring program.
Figure 8B:
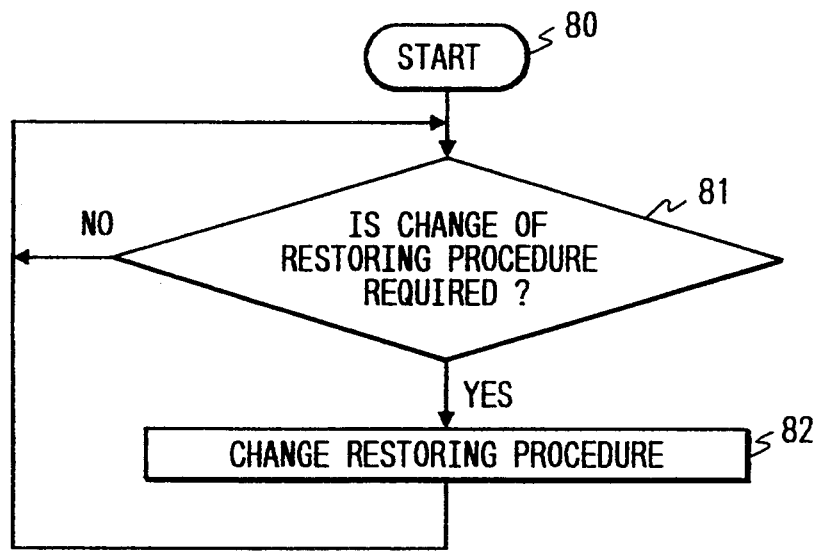
FIG. 8(B) is a flowchart showing a restoring procedure changing program.
Figure 10:
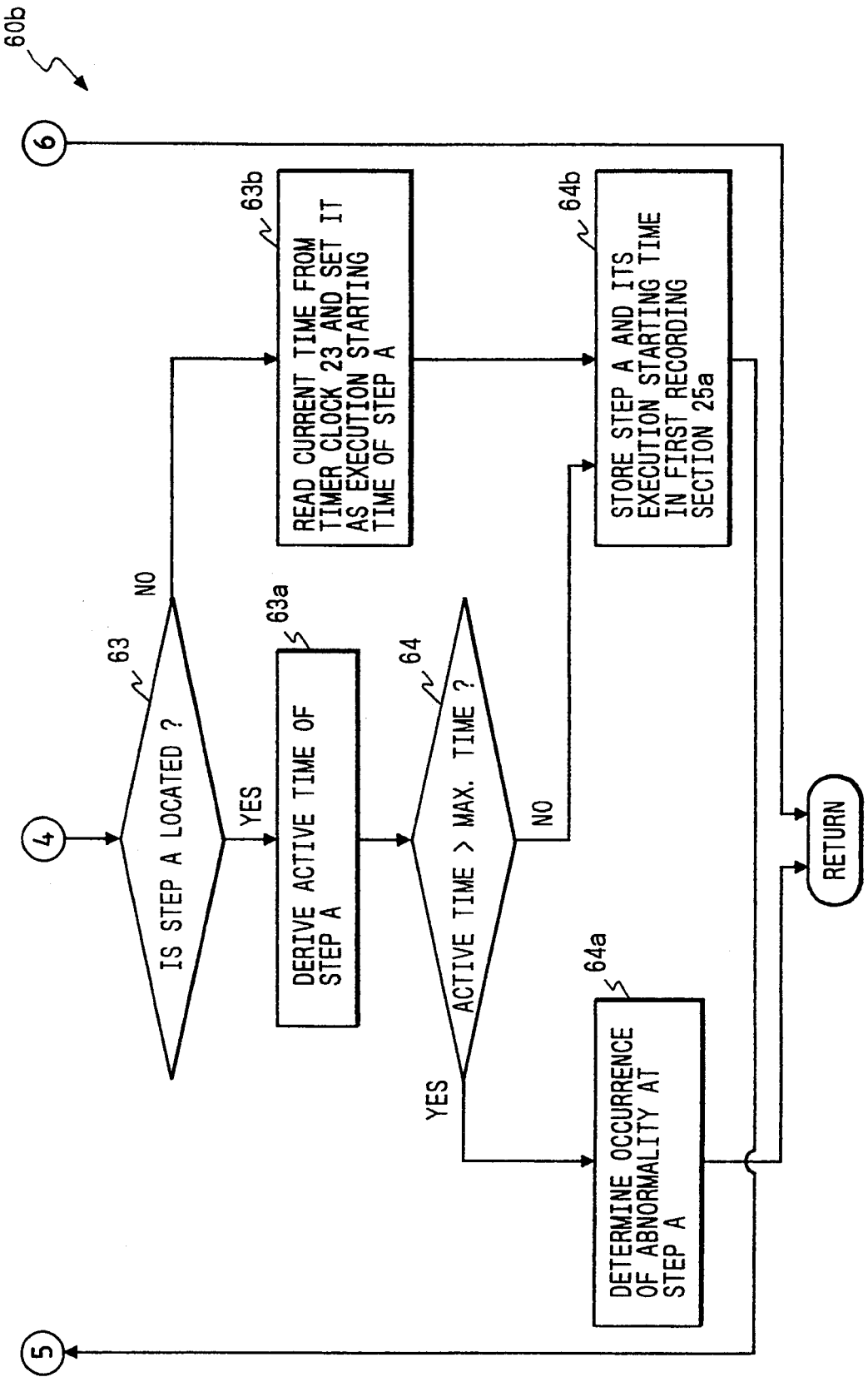

As shown in FIG. 1, the abnormality processing module 20D includes an abnormality determining section 20D1 and a restoring section 20D2 and executes an abnormality determining and restoring program identified by flowcharts in FIG. 8(A) and FIGS. 9 to 14 as well as a restoring procedure changing program identified by a flowchart in FIG. 8(B). These programs are prestored in an internal memory of the abnormality processing module 20D.

Figure 6:
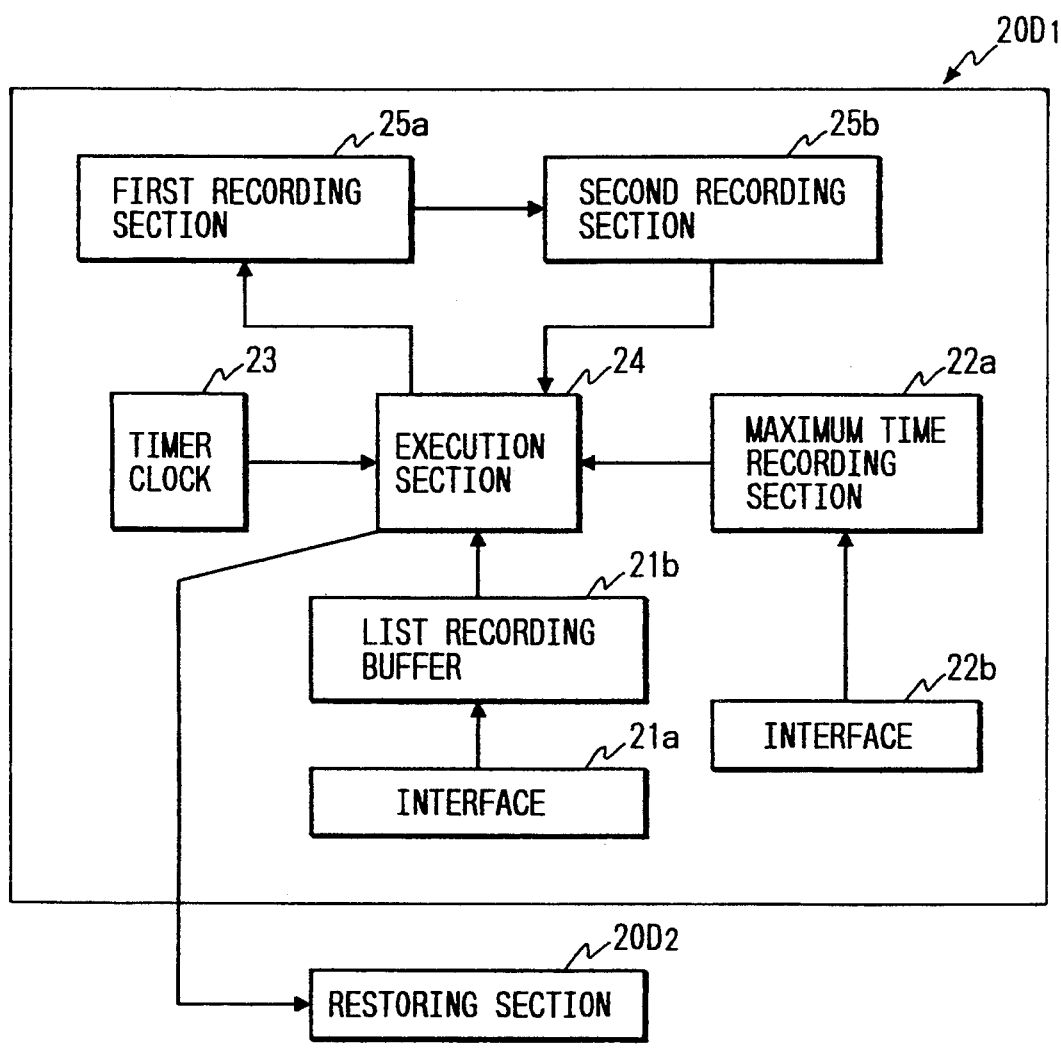
FIG. 6 is a block diagram showing an abnormality determining section shown in FIG. 1.

Referring now to FIG. 6, the abnormality determining section 20D1 receives via an interface 21a the data including the foregoing active step list to temporarily store them at a list recording buffer 21b. The abnormality determining section 20D1 includes the maximum time recording section 22a which prestores a maximum time for each step of the unit operating program. These data may also be input to the maximum time recording section 22a via an interface 22b by means of an operator's input through the control panel 30.

A timer clock 23 constantly measures a current time which is input to an execution section 24. The execution section 24 has first and second recording sections 25a and 25b as its working area and performs a scanning action through the second recording section every time it receives a number of the active step from the list recording buffer 21b to check whether the received active step number is already recorded therein. When it is not recorded in the second recording section 25b, then the received active step number and a current time input from the timer clock 23 are stored in the first recording section 25a as paired data. The data stored in the first recording section 25a is transferred to the second recording section 25b before the execution section 24 performs a next scanning action. The data stored in the first recording section 25a is cleared after it is transferred to the second recording section 25b. Accordingly, the first recording section 25a always stores a number of the active step located through the last scan of the unit operating program by the CPU module 20B and a time of starting the execution of the corresponding active step.

On the other hand, when the received active step number is already stored in the second recording section 25b, the execution section 24 reads out the execution starting time for the received active step number from the second recording section 25b and subtracts the execution starting time from the current time input from the timer clock 23 to derive an active time period of that step. Subsequently, the execution section 24 compares the derived active time period with a corresponding prestored maximum time. When the maximum time is less than the derived active time period, the execution section 24 determines an occurrence of the abnormal condition at this step, and inputs the number of this step to the restoring section 20D2. Simultaneously, the execution section 24 also outputs a signal via the bus 20A for setting the CPU module 20B to the manual operation mode.

Figure 7:
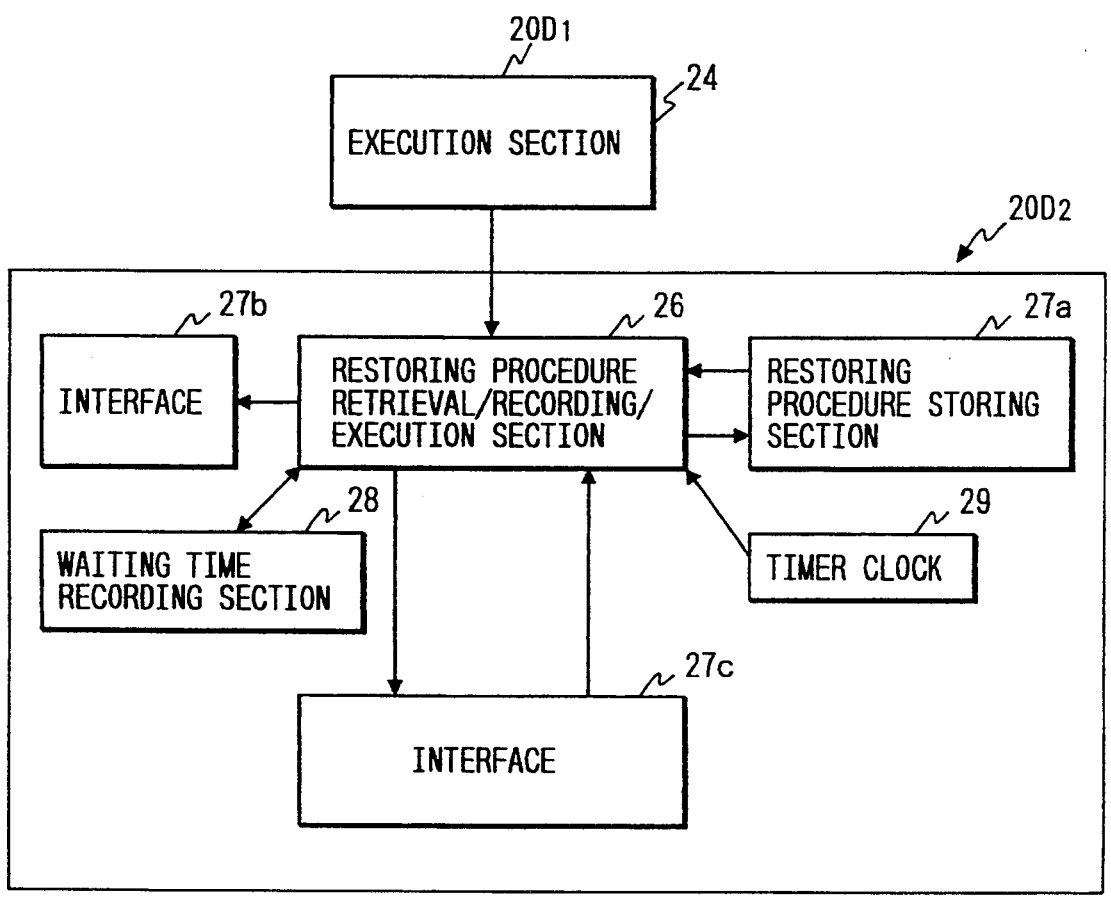
FIG. 7 is a block diagram showing a restoring section shown in FIG. 1.

As shown in FIG. 7, the restoring section 20D2 includes a restoring procedure retrieval/record/execution section 26 (hereinafter referred to as "restoring procedure section 26") which performs the retrieval, recording and execution of the restoring procedure for restoring the loader unit 10 from its abnormal condition or malfunction in cooperation with the execution section 24 of the abnormal determining section 20D1, a restoring procedure storing section 27a, an interface 27b with the CPU module 20B, an interface 27c with the control panel 30, a maximum waiting time recording section 28 and a timer clock 29. In the restoring procedure storing section 27a, a number of each step of the unit operation program and a plurality of corresponding restoring procedures with corresponding abnormal conditions or symptoms in the form of message number are prestored, for example, as data shown in Table 2. When the restoring procedure is executed by the restoring procedure section 26, the CPU module 20B executes the manual operation mode at the step 52 of the unit operating program. Specifically, respective loader unit operations included in the restoring procedure are input to the CPU module 20B in a sequential order, which are dealt with as equivalent to operator's manual inputs via the control panel 30 so as to automatically restore the loader unit 10 from the abnormal condition.

TABLE 2

| STEP | MESSAGE NUMBER | RESTORING PROCEDURE ||||||
|---|---|---|---|---|---|---|---|
| | | 1 | 2 | 3 | 4 | 5 | --- |
| 43 | 1 | HAND OPEN | LOADER UP | MESSAGE 2 | LOADER DOWN | HAND CLOSE | --- |
| | 5 | MESSAGE 10 | LOADER UP | LOADER FORWARD | LOADER DOWN | HAND OPEN | --- |
| : | : | : | : | : | : | : | : |
| 46 | 3 | LOADER UP | MESSAGE 4 | LOADER DOWN | HAND OPEN | FINISH | |
| | 8 | MESSAGE 12 | FINISH | | | | |
| : | : | : | : | : | : | : | : |

The maximum waiting time recording section 28 is used for ensuring the execution of the restoring operations performed by CPU module 20B. Specifically, the maximum waiting time recording section 28 prestores a maximum waiting time for each operation included in the restoring procedure. The CPU module 20B is arranged to send back a signal indicative of a completion of each restoring operation instructed by the restoring procedure section 26 via the interface 27b. Correspondingly, the restoring procedure section 26 is arranged to await instructing a subsequent restoring operation until the completion signal from the CPU module 20B is received. When the completion signal from the CPU module 20B is delayed over the preset maximum waiting time, the automatic restoring process is abandoned to switch over to the operator's manual operations for manually restoring the loader unit 10 from the abnormality. The data prestored in the maximum waiting time recording section 28 is shown in Table 3 as an example. The maximum waiting time recording section 28 may be omitted in case the control system is of a type not to confirm the completion of each restoring operation at the CPU module 20B. In this case, in order to ensure the completion of each restoring operation for the loader unit 10, it may be arranged that the restoring procedure section 26 awaits a preset time generally determined for all the restoring operations or determined for each restoring operation, before instructing a next restoring operation. The timer clock 29 functions similar to the timer clock 23 in the abnormality determining section 20D1 and feeds a current time to the restoring procedure section 26.

TABLE 3

| CONTROL PERFORMED BY CPU MODULE | MAXIMUM WAITING TIME |
|---|---|
| LOADER DOWN | 1 (sec) |
| CHUCK | 0.5 (sec) |
| LOADER UP | 1 (sec) |
| OPERATION OF CONVEYER 11 | 2 (sec) |

The abnormality processing module 20D, more specifically the execution section 24 and the restoring procedure section 26, executes the abnormality determining and restoring program in parallel according to the flowcharts in FIGS. 8(A) and FIGS. 9 to 14, and the restoring procedure changing program according to the flowchart in FIG. 8(B), each of which will be described hereinbelow.

After the abnormality determining and restoring program is started at a step 60 in FIG. 8(A), the program proceeds to a step 60a where the data stored in the foregoing second recording section 25b is cleared. Subsequently, the program goes to a step 60b where an abnormality determining routine of FIGS. 9 and 10 (hereinafter referred to as "abnormality determining routine 60b") is executed. During the execution of the abnormality determining routine 60b, the operator's input via the control panel 30 is not recorded in the abnormality processing module 20D, but directly transmitted to the CPU module 20B.

In the abnormality determining routine 60b, the data stored in the first recording section 25a is cleared at a step 61. Subsequently, at a step 61a, the active step list transmitted from the CPU module 20B at the step 52 of the unit operating program is read out in the list recording buffer 21b via the interface 21a. A step 62 checks whether the list recording buffer 21b is empty. This time, the answer at the step 62 becomes NO, and the program advances to a step 62a where an active step or one of active steps stored in the list recording buffer 21b is read out and set to A. At a subsequent step 62b, the step A is searched through the second recording section 25b.

Subsequently, a step 63 checks whether the step A is stored in the second recording section 25b. If answer at the step 63 is YES, the program goes to a step 63a where an active time period of the step A is derived as a difference between an execution starting time of the step A stored in the second recording section 25b and a current time input from the timer clock 23. A step 64 checks whether the derived active time period exceeds a preset maximum time. If answer at the step 64 is YES, i.e. the derived active time period is larger than the preset maximum time, the program proceeds to a step 64a where an occurrence of the abnormality at the step A is determined.

On the other hand, if answer at the step 64 is NO, the program goes to a step 64b where the step A and its execution starting time are stored in the first recording section 25a. Referring back to the step 63, if answer at the step 63 is NO, i.e. the step A is not stored in the second recording section 25b, the program goes to a step 63b where a current time from the timer clock 23 is read out and set as the execution starting time of the step A, and further goes to the step 64b where the step A and its execution starting time are stored in the first recording section 25a. Referring further back to the step 62, if answer at the step 62 is YES, i.e. the list recording buffer 21b is empty, the program proceeds to a step 62c where the data stored in the first recording section 25a is transferred to the second recording section 25b.

Figure 11:
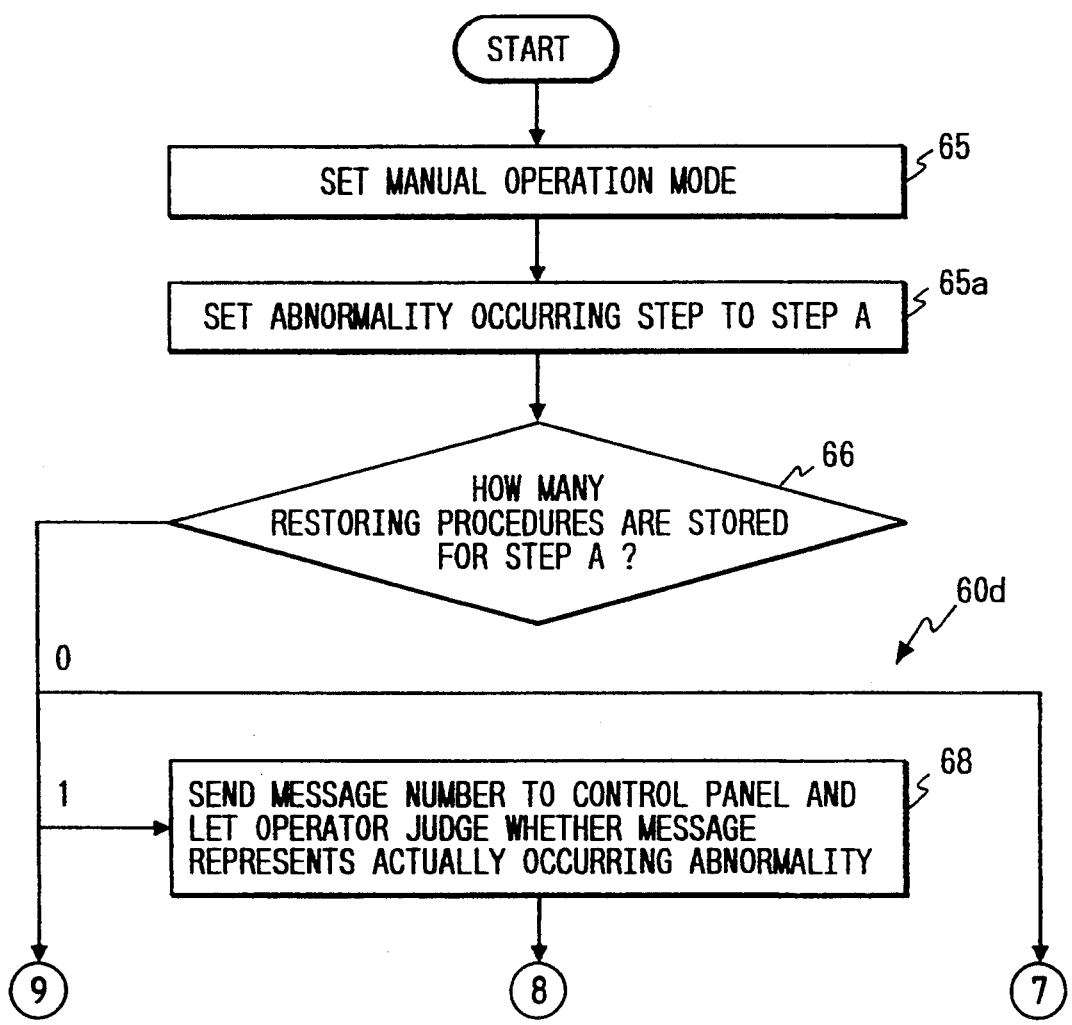
FIGS. 11 and 12 a flowchart of a restoring routine.
Figure 12:
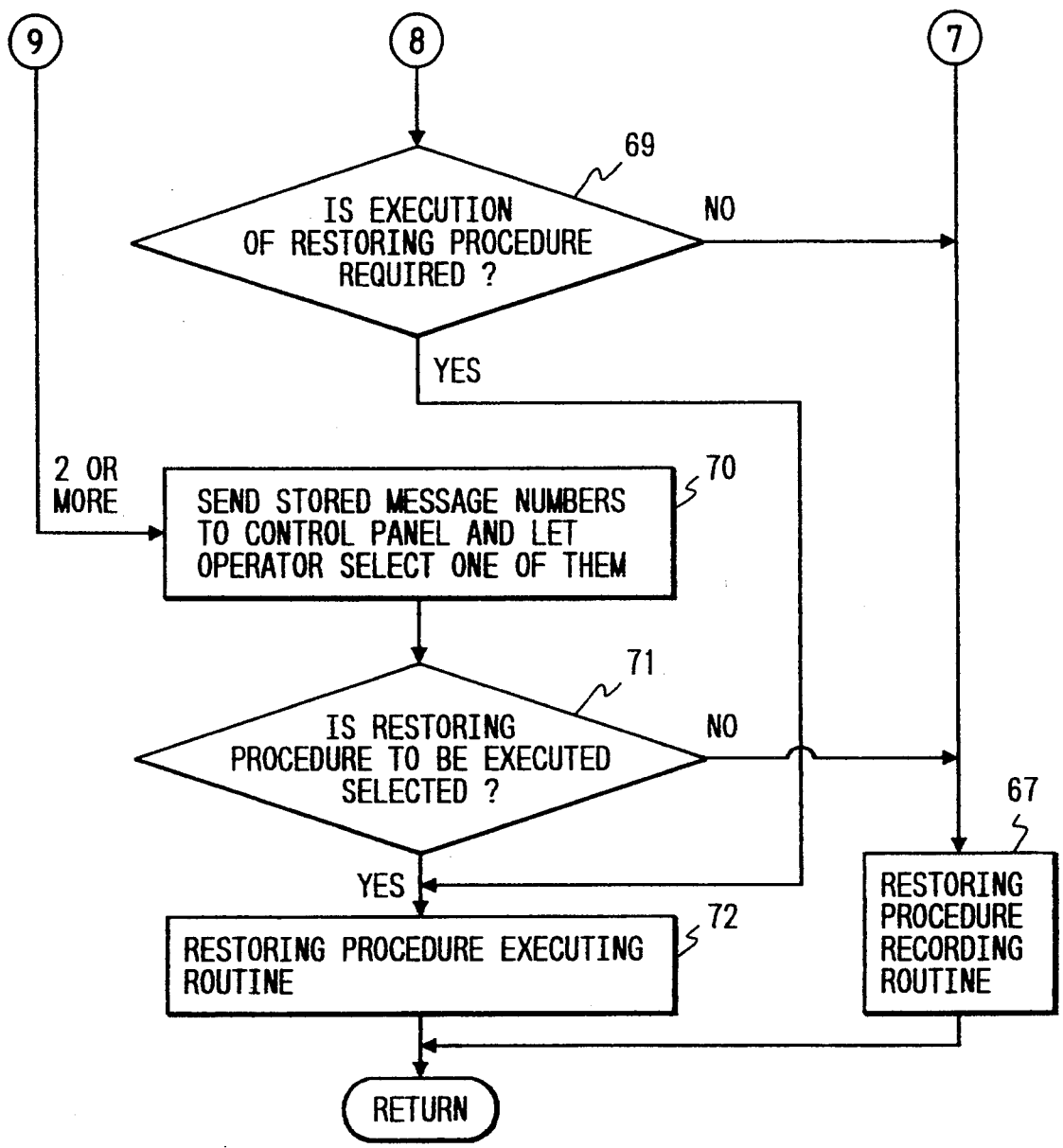

As described above, when the abnormality determining routine 60b decides at the step 64a that the abnormality is occurring at the step A, then the step 60c of the abnormality determining and restoring program of FIG. 8(A) yields a positive answer so that the program proceeds to a step 60d where the restoring routine (hereinafter referred to as "restoring routine 60d") of FIGS. 11 and 12 is executed by the restoring procedure section 26.

Figure 13:
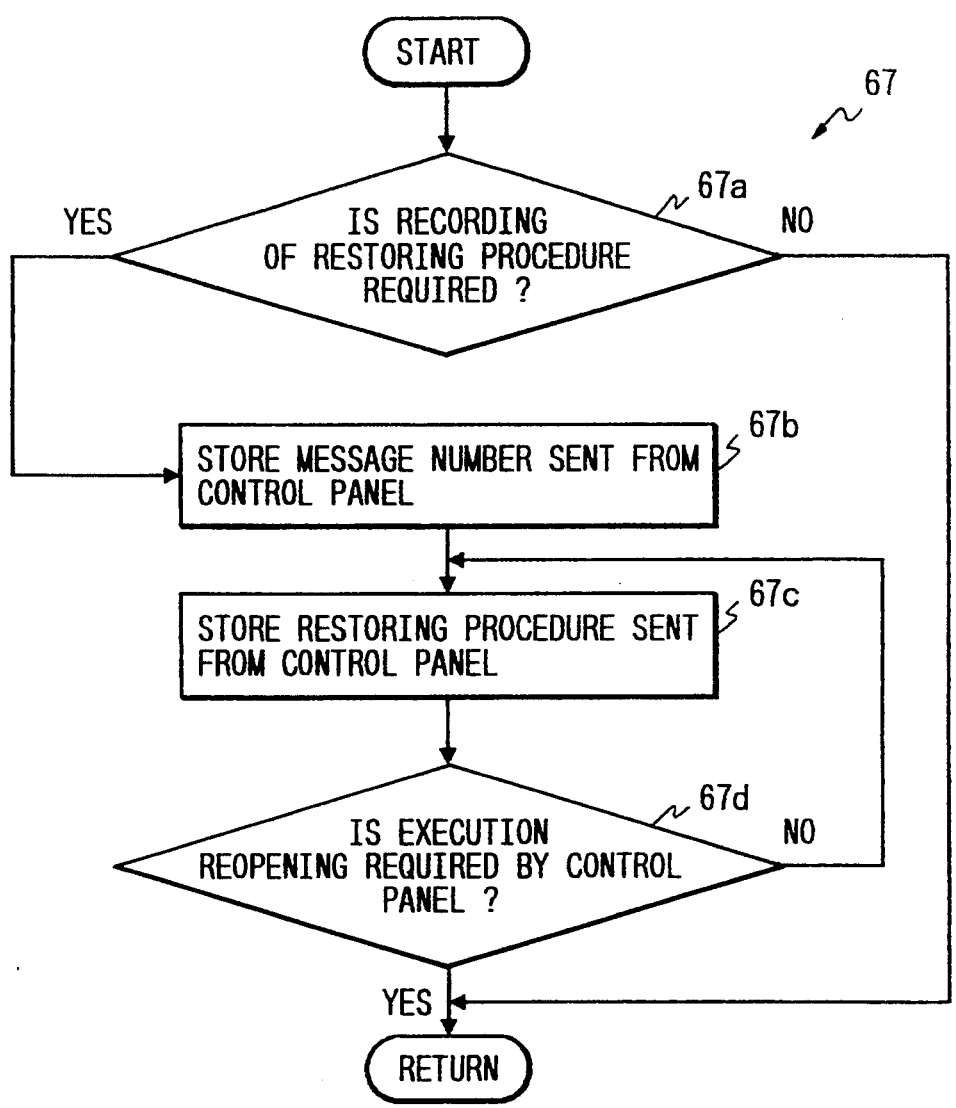
FIG. 13 is a flowchart showing a restoring procedure recording routine.
Figure 14:
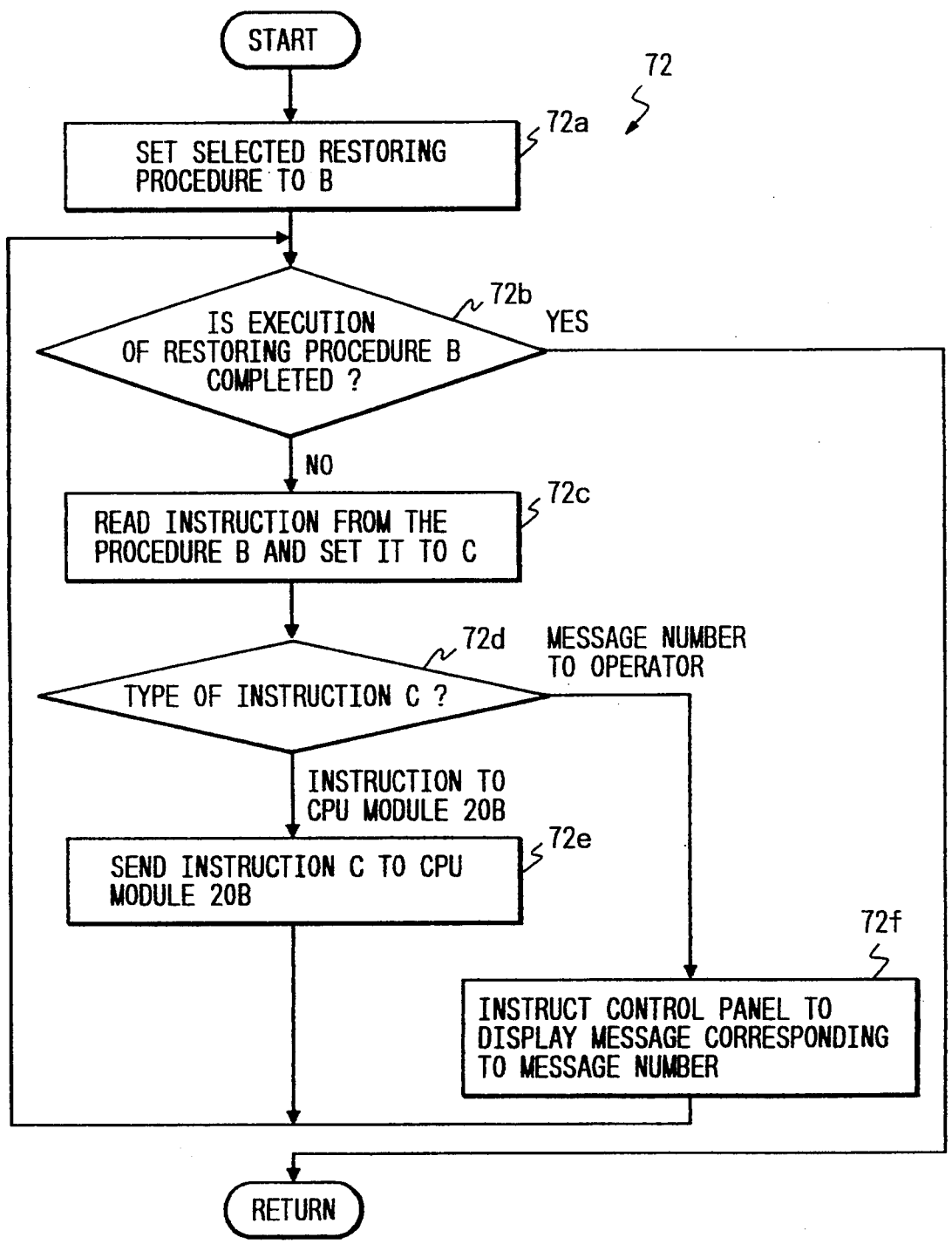
FIG. 14 is a flowchart showing a restoring procedure execution routine.

At a first step 65 of the restoring routine 60d, the CPU module 20B is set to the manual operation mode. Subsequently, at a step 65a, the active step at which the abnormality is determined as being occurring is set to A. Then, a step 66 checks the number of the restoring procedures stored in the restoring procedure storing section 27a. If answer at the step 66 is "0", then the routine proceeds to a step 67 where a restoring procedure recording routine (hereinafter referred to as "restoring procedure recording routine 67") of FIG. 13 is executed. If answer at the step 66 is "1", the routine goes to a step 68 where a message number indicative of the corresponding abnormal symptom is sent to the control panel 30 so as to allow the operator to judge whether the abnormal condition represented by the message number is the same as the actually occurring abnormal condition. A subsequent step 69 checks whether the operator has required the execution of the restoring procedure via the control panel 30. If answer at the step 69 is YES, then the routine goes to a step 72 where a restoring procedure execution routine (hereinafter referred to as "restoring procedure execution routine 72") of FIG. 14 is executed. On the other hand, if answer at the step 69 is NO, then the routine proceeds to the step 67 where the restoring procedure recording routine 67 is executed.

If answer at the step 66 is "2 or more", then the routine advances to a step 70 where all the message numbers indicative of the respective abnormal conditions stored in the restoring procedure recording section 27a are sent to the control panel 30 to allow the operator to judge which of the message numbers represents the actually occurring abnormal condition. At a subsequent step 71, it is checked whether the operator has selected one of the message numbers, i.e. whether the operator has selected the restoring procedure to be executed. If answer at the step 71 is YES, then the routine goes to the step 72 to execute the restoring procedure execution routine 72. On the other hand, if answer at the step 72 is NO, the routine proceeds to the step 67 to execute the restoring procedure recording routine 67.

In the restoring procedure recording routine 67 of FIG. 13, a first step 67a checks whether the operator has required the recording of the restoring procedure via the control panel 30. If answer at the step 67a is YES, the routine goes to a step 67b where a message number sent from the control panel 30 is stored in the restoring procedure storing section 27a. Subsequently, the routine goes to a step 67c where a restoring procedure sent from the control panel 30 is also stored in the restoring procedure storing section 27a. A subsequent step 67d checks whether the operator has required reopening of the automatic operation mode for the loader unit 10. If answer at the step 67d is YES, the restoring procedure recording routine 67 is completed. On the other hand, if answer at the step 67d is NO, then the step 67c is repeated. Referring back to the step 67a, if answer at the step 67a is NO, then the restoring procedure recording routine is finished.

In the restoring procedure execution routine 72 of FIG. 14, at a first step 72a, the restoring procedure to be executed is set to B. Subsequently, a step 72b checks whether the restoring procedure B has been executed. If answer at the step 72b is YES, then the restoring procedure execution routine 72 is completed. On the other hand, if answer at the step 72b is NO, the routine goes to a step 72c where an instruction is derived from the restoring procedure B and set to C. Subsequently, at a step 72d, a kind or type of the instruction C is checked. If the type of the instruction C is instruction data for the CPU module 20B, the routine goes to a step 72e where the instruction C is sent to the CPU module 20B as the instruction data for the CPU module 20B. On the other hand, if the type of the instruction C is a message number for the operator, then the routine goes to a step 72f where the control panel is instructed to display a message corresponding to the instruction C, i.e. the message number.

Referring now to the restoring procedure changing program of FIG. 8(B), a first step 81 checks whether the operator has required a change of the restoring procedure via the control panel 30. If answer at the step 81 is YES, the program goes to a step 82 where a restoring procedure changing process is executed.

Figure 15:
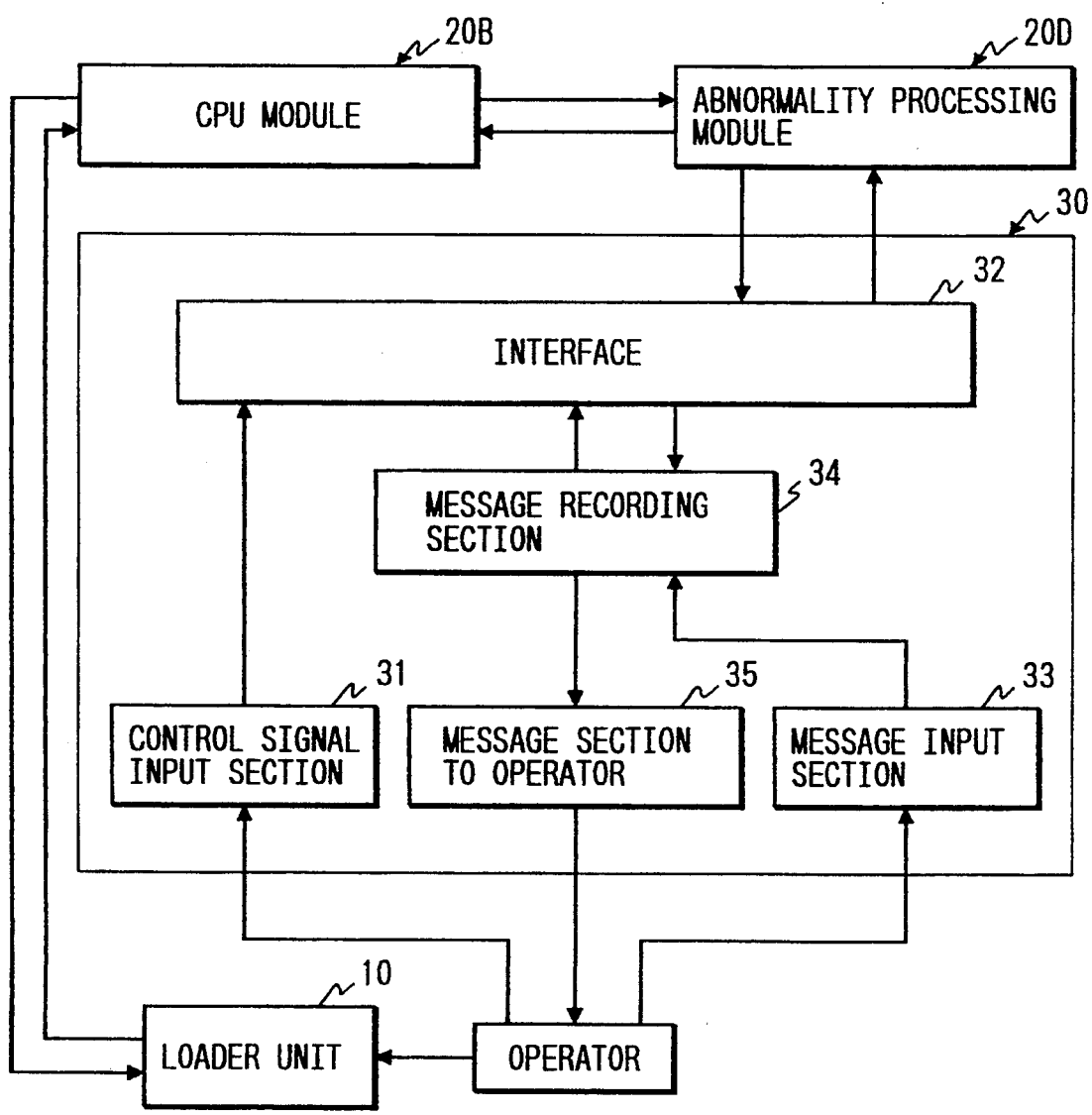
FIG. 15 is a block diagram of a control panel shown in FIG. 1.

The control panel 30 executes an operating program according to flowcharts of FIGS. 16 to 21. This operation program is prestored in an internal memory of the control panel 30. As shown in FIG. 15, the control panel 30 includes a control signal input section 31 which is formed by a push-button switch, a rotary switch, a touch panel and a keyboard or the. Instead of this, the control signal input section 31 may be formed by such as a voice input device and an image input device. The control signal input section 31 transmits the control signal input by the operator to the abnormality processing module 20D via an interface 32. At a normal operating condition of the loader unit 10, the control signal input section 31 allows the operator's manual input for the CPU module 20B to be sent to the CPU module 20B via the interface 32 and the abnormality processing module 20D.

A message input section 33 sends an operator's message to a message recording section 34 which stores the operator's message input through the message input section 33. It may be also possible to prestore standard messages prepared by a programmer at the message recording section 34 instead of the operator's message input from the message input section 33. A message section 35 is formed by an output device such as a display device, a printer, an alarm lamp, an alarm buzzer and a voice alarm. The message section 35, for example, displays the message from the message recording section 34 to the operator.

The operations of the control panel 30 will be described hereinbelow with reference to the operation program as shown in FIGS. 16 to 21.

Figure 16:
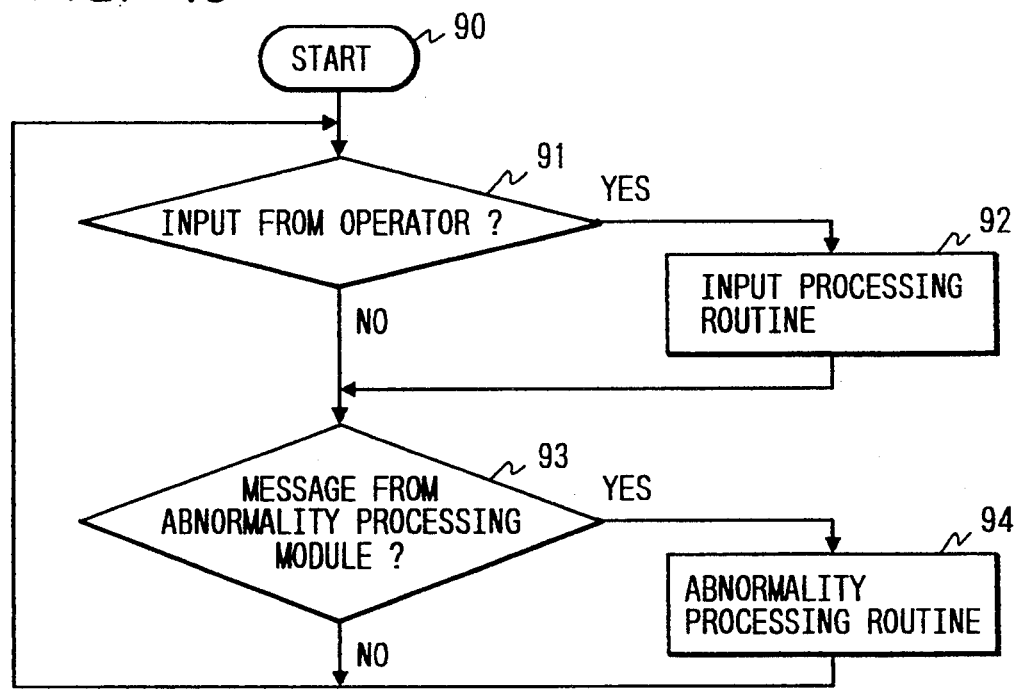
FIG. 16 is a flowchart representing operations of the control panel.
Figure 17:
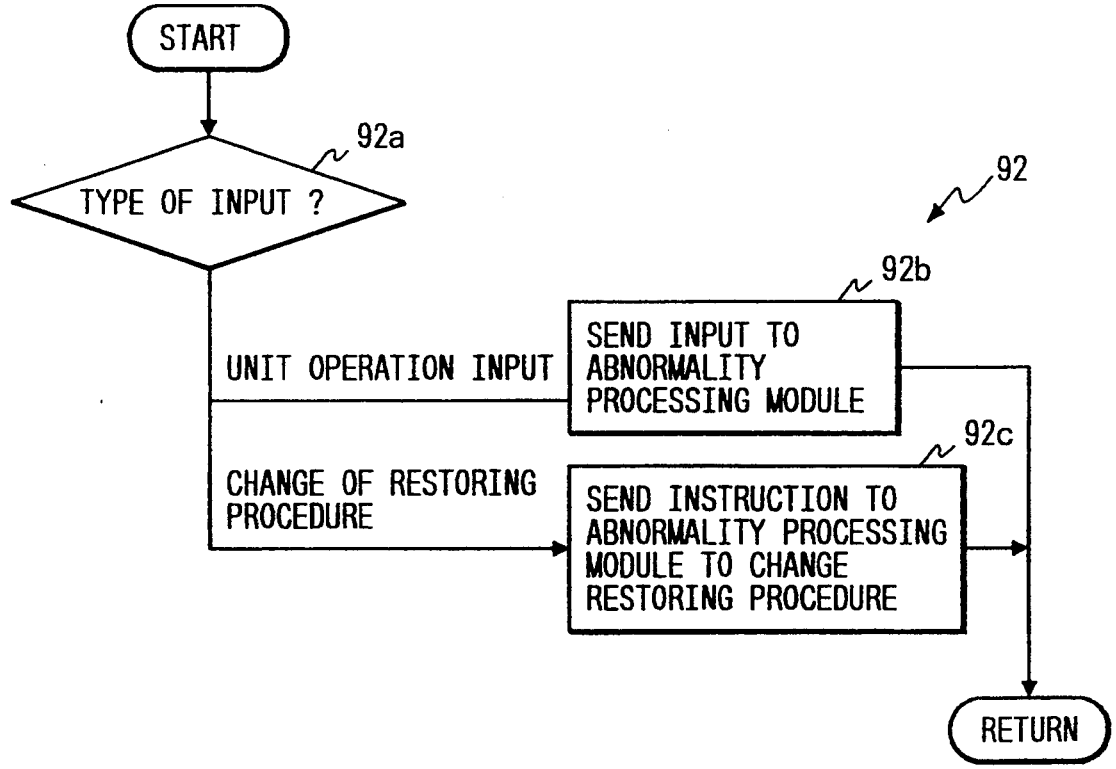
FIG. 17 is a flowchart showing an input processing routine.

After the operation program is started at a step 90 in FIG. 16, a step 91 determines whether there is an operator's input. If answer at the step 91 is YES, the program proceeds to a step 92 where an input processing routine (hereinafter referred to as "input processing routine 92") of FIG. 17 is executed.

In this input processing routine 92, a first step 92a determines a type of the operator's input. If the type of the operator's input is a unit operation input for operating the loader unit 10, then the routine goes to a step 92b where the unit operation input is sent to the abnormality processing module 20D. On the other hand, if the type of the operator's input is changing a restoring procedure, then the routine goes to a step 92c where the abnormality processing module 20D is instructed to change the restoring procedure.

Figure 18:
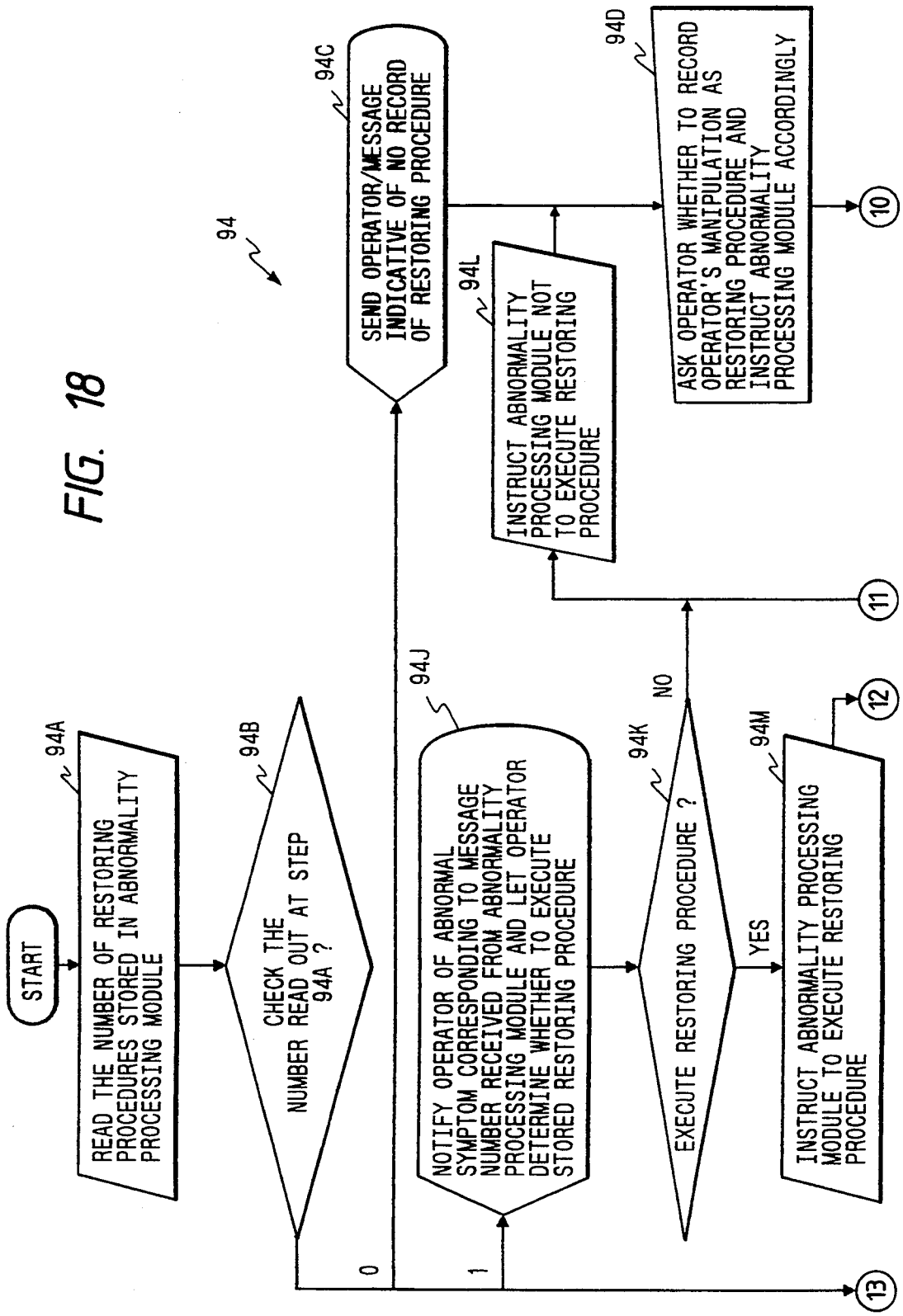
FIGS. 18 and 19 show a flowchart of an abnormality processing routine.
Figure 19:
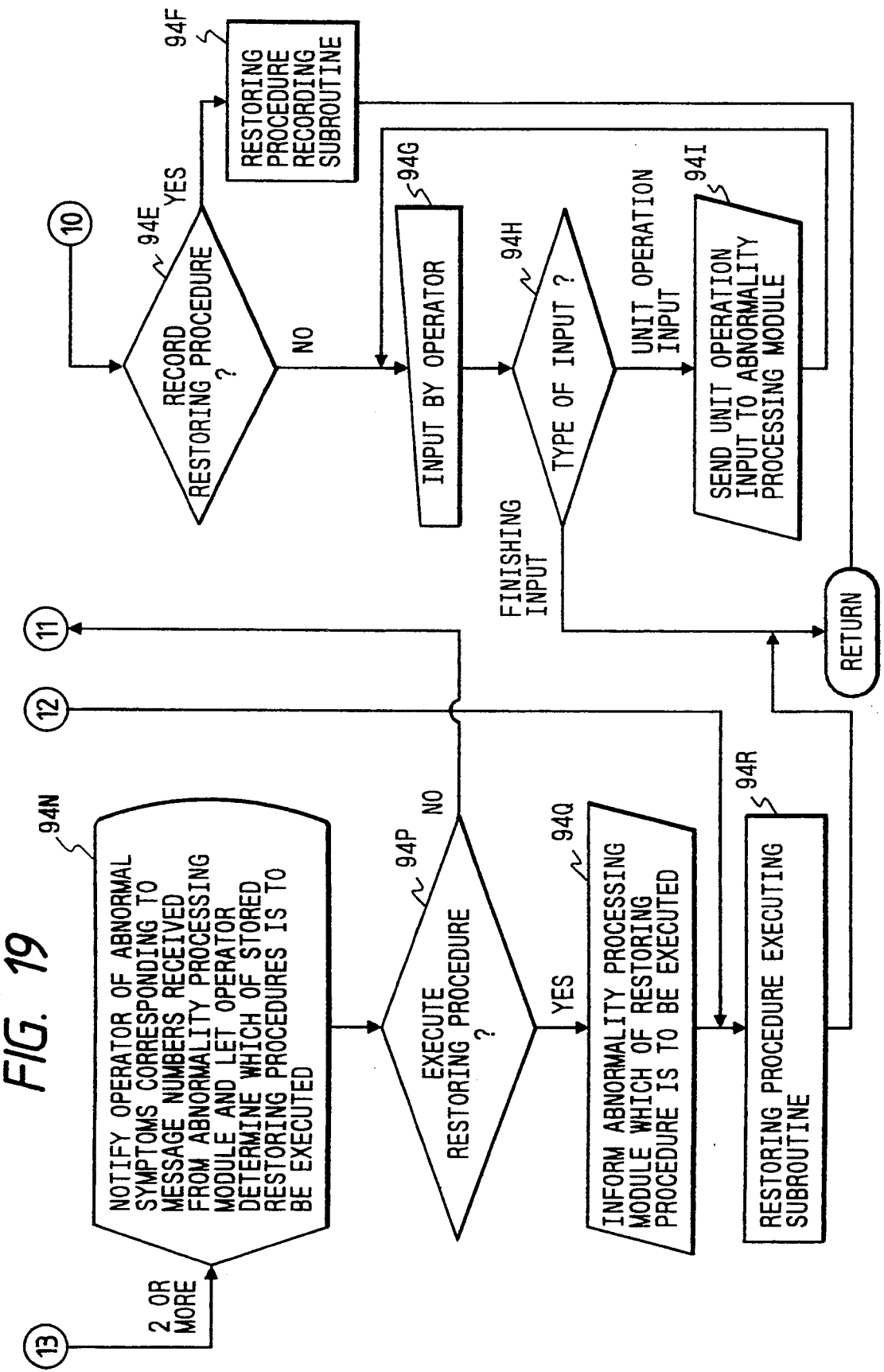

After the input processing routine 92 has been executed or when answer at the step 91 is NO, the operation program proceeds to a step 93 which checks whether there is a message from the abnormality processing module 20D. If answer at the step 93 is YES, then the program goes to a step 94 where an abnormality processing routine (hereinafter referred to as "abnormality processing routine 94") of FIGS. 18 and 19 is executed.

Figure 20:
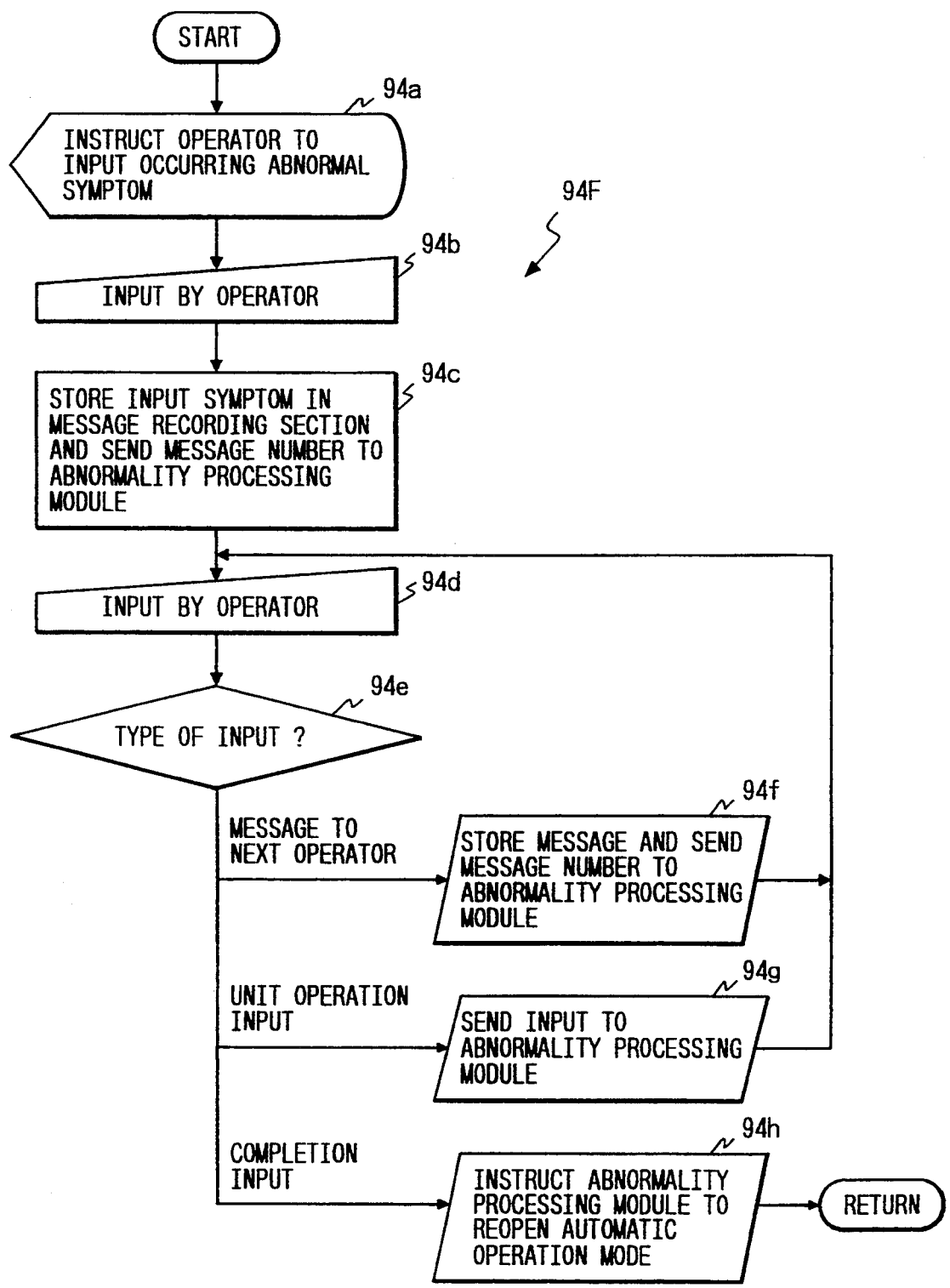
FIG. 20 is a flowchart showing a restoring procedure recording subroutine.

In this abnormality processing routine 94, at a first step 94A, the number of restoring procedures for the step A stored in the restoring procedure storing section 27a is received from the abnormality processing module 20D. Subsequently, a step 94B determines the number of the stored restoring procedures. If answer at the step 94B is "0", the routine proceeds to a step 94C where a message of no restoring procedure being stored is sent to the operator. Then, a step 94D asks the operator whether a subsequent manual operation should be stored as a restoring procedure and transmits an operator's decision to the abnormality processing module 20D. This operator's decision is checked at the step 67a in FIG. 13. Subsequently, a step 94E checks whether the operator has required to store the restoring procedure. If answer at the step 94E is YES, the routine goes to a step 94F where a restoring procedure recording subroutine (hereinafter referred to as "restoring procedure recording subroutine 94F") of FIG. 20 is executed.

In this restoring procedure recording subroutine 94F, a first step 94a instructs the operator to input a condition or symptom for identifying the occurring abnormality. After the operator's input is finished at a step 94b, a subsequent step 94c stores the operator's input symptom in the message recording section 34 and transmits a corresponding message number to the abnormality processing module 20D. This message number is stored at the step 67b in FIG. 13.

Subsequently, an operator's input is performed at a step 94d, and a type of the operator's input is checked at a step 94e. If answer at the step 94e is that the operator's input is an instruction message for another operator to restore the loader unit 10 from this abnormality, the routine proceeds to a step 94f where the instruction message is stored in the message recording section 34 and its corresponding message number is sent to the abnormality processing module 20D. This message number is stored at the step 67c in FIG. 13. If answer at the step 94e is that the operator's input is the unit operation input, the routine proceeds to a step 94g where the operator's input is sent to the abnormality processing module 20D. This operator's input is stored at the step 67c in FIG. 13. If answer at the step 94e is that the operator's input is an input indicative of termination of recording of the restoring procedure, the routine proceeds to a step 94h where the automatic operation mode reopening demand is sent to the abnormality processing module 20D so that the restoring procedure recording subroutine is completed. This automatic operation mode reopening demand is checked at the step 67d in FIG. 13.

Referring back to the step 94E in FIG. 19, if answer at the step 94E is NO, the routine proceeds to a step 94G where an operator's input is allowed. A subsequent step 94H checks a type of the operator's input. If answer at the step 94H is that the operator's input is an input indicative of termination of the routine, the abnormality processing routine 94 is terminated. On the other hand, if answer at the step 94H is that the operator's input is the unit operation input indicative of operations of the loader unit 10, the routine proceeds to a step 94I where the operator's input is sent to the abnormality processing module 20D.

Referring back to the step 94B in FIG. 18, if answer at the step 94B is "1", the routine goes to a step 94J where a stored abnormal symptom corresponding to the message number received from the abnormality processing module 20D (at the step 68 in FIG. 11) is notified to the operator and let the operator determine whether a stored corresponding restoring procedure is to be executed. A subsequent step 94K checks whether the restoring procedure is to be executed. If answer at the step 94K is NO, the routine proceeds to a step 94L which instructs the abnormality processing module 20D not to execute the restoring procedure. On the other hand, if answer at the step 94K is YES, then the routine goes to a step 94M which informs the abnormality processing module 20D that the restoring procedure is to be executed. Subsequently, the routine proceeds to a step 94R where a restoring procedure execution subroutine (hereinafter referred to as "restoring procedure execution subroutine 94R") of FIG. 21 is executed.

On the other hand, if answer at the step 94B is "2 or more", the routine proceeds to a step 94N where stored abnormal symptoms corresponding to the message numbers received from the abnormality processing module 20D (at the step 70 in FIG. 12) are notified to the operator and let the operator select which one of stored restoring procedures is to be executed. A subsequent step 94P checks whether the restoring procedure is to be executed. If answer at the step 94P is NO, the routine proceeds to the step 94L. On the other hand, if answer at the step 94P is YES, the routine goes to a step 94Q which informs the abnormality processing module 20D of the restoring procedure to be executed. Subsequently, the routine goes to the step 94R where the restoring procedure executing subroutine 94R is executed.

Figure 21:
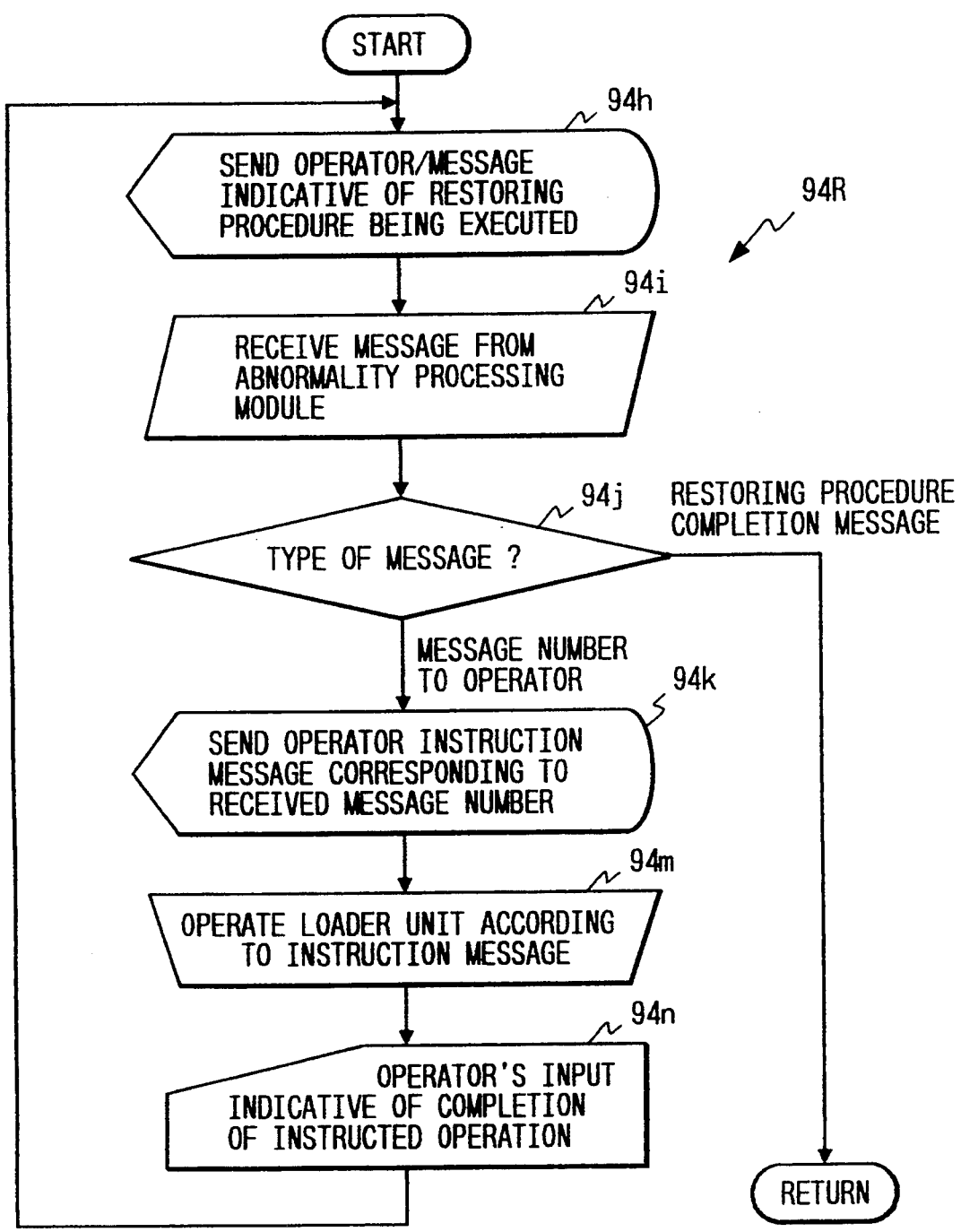
FIG. 21 is a flowchart showing a restoring procedure executing subroutine.

In the restoring procedure executing subroutine 94R in FIG. 21, at a first step 94h, a message indicative of the restoring procedure being executed is notified to the operator. At a subsequent step 94i, a message from the abnormality processing module 20D is received. A step 94j checks a type of the message received at the step 94i.

If answer at the step 94j is that the received message is indicative of completion of the abnormality processing, this subroutine is terminated. On the other hand, if answer at the step 94j is that the received message is indicative of a message number of an instruction to the operator, the routine goes to a step 94k where the corresponding instruction is notified to the operator. Subsequently, a step 94m allows the operator to operate the loader unit 10 according to the notified instruction. Then, at a step 94n, the operator inputs an indication that the execution of the instructed operation has been finished.

Now, the operation of the foregoing first preferred embodiment will be described with reference to predictable specific abnormality or malfunctions of the loader unit 10.

1. EXAMPLE OF ABNORMALITY (1) SOME OPERATION OF THE LOADER UNIT 10 IS NOT COMPLETED OR FINISHED

For example, the upward, downward, forward, or backward operation of the loader 12 or the chucking or unchucking operation of the hand 12a of the loader 12 is suspended on the way. Or, the work piece W on the conveyer 11 or 13 is not confirmed or located.

(2) WORK PIECE W FALLS OFF

For example, the work piece W falls off the hand 12a during the movement of the loader 12 due to the lowering of the gripping force of the hand 12a.

(3) FAILURE OF SENSOR

For example, two sensors arranged to detect respective operation end points of the loader 12 simultaneously detects the corresponding operation end points.

2. EXAMPLE OF DETERMINATION OF ABNORMALITY AND RESTORATION THEREOF

One example will be explained hereinbelow, wherein the hand 12a does not close sufficiently so that it fails to chuck the work piece W and the work piece W is stopped on the conveyer 11 being inclined. In order to ensure the execution of the restoring operation, this example utilizes a maximum time preset for each restoring operation. It may be also possible to use the foregoing maximum waiting time for each restoring operation.

(1) PREPARATION FOR ABNORMALITY DETERMINATION

The abnormality is determined when the execution of one of the steps of the unit operating program exceeds a corresponding preset maximum time. Accordingly, the date of the foregoing Table 1 is utilized.

(2) DETERMINATION OF ABNORMALITY

In this example, the hand 12a does not close sufficiently so that the position sensor LS2 continues to be set OFF. Accordingly, the unit operating program can not proceed from the step 43 to the step 44 in FIG. 4. In this regard, when the execution time of the step 43 exceeds its preset maximum time of "1 sec." (Table 1), the abnormality determining section 20D1 of the abnormality processing module 20D determines an occurrence of the abnormality at the step 43.

(3) NOTIFICATION OF ABNORMALITY, RESTORING OPERATION AND RECORDING RESTORING PROCEDURE (a) The occurrence of the abnormality is notified to the operator. The CPU module is set to the manual operation mode.

(b) The operator looks into cause of the abnormality. The operator performs the restoring operation through the control panel 30.

(c) The operator records an abnormal symptom or condition that the loader 12 is lowered right above the conveyer 11 and the work piece W is stopped on the conveyer being inclined.

(d) The operator performs a manual operation through the control panel 30 for restoring the loader 12 from the abnormal condition and records such a manual operation, i.e. the restoring procedure. Time intervals between the operator's manual operation steps are also recorded.

① Open the hand 12a of the loader 12.
② Raise the loader 12.
③ Posture of the work piece W is corrected in order for the hand 12a to chuck the work piece W.
④ A work message that the posture of the work piece W is corrected in order for the hand 12a to chuck the work piece W, is recorded.
⑤ Lower the loader 12.
⑥ Close the hand 12a of the loader 12.
⑦ Set the CPU module 12B to the manual operation mode.

(4) AUTOMATIC EXECUTION OF RESTORING PROCEDURE

When the same or similar abnormality occurs, the loader 12 is restored from the abnormality by executing the stored restoring procedure. In the automatic execution of the stored restoring procedure, the time intervals between the steps of the restoring procedure are also reproduced.

(a) The operator is notified of the fact that the restoring procedure is recorded and of the stored abnormal symptom.

(b) Upon confirming that the stored abnormal symptom satisfies the actually occurring abnormal condition, the operator instructs the execution of the stored restoring procedure.

(c) According to the instructions from the abnormality processing module 20D, the hand 12a of the loader 12 is opened and the loader 12 is raised.

(d) The stored work message that the posture of the work piece W is corrected in order for the hand 12a to chuck the work piece W, is notified to the operator via the control panel 30.

(e) After having corrected the posture of the work piece W, the operator instructs via the control panel 30 the abnormality processing module 20D to continue the restoring procedure.

(f) According to the instructions from the abnormality processing module 20D, the loader 12 is lowered and the hand 12a is closed. The CPU module 20B is set to the automatic operation mode.

As described above, since the determination of the abnormality of the loader unit 10 as well as the restoration of the loader unit 10 from its abnormality are performed based on the separately provided abnormality determining and restoring program in the abnormality processing module 20D, the structure of the unit operating program in the CPU module 20B can be made less complicated. Further, when necessity occurs to change, such as, the definition of the abnormality or the restoring procedure, it is easily performed even by the normal operator with the CPU module 20B being active. It may also be possible to easily add the abnormality determining function and the restoration function to another control device which otherwise has no such functions, by adding the abnormality processing module 20D. Further, even when non-stored abnormality is raised, a corresponding restoring procedure can be recorded by the operator's manual operation to allow such a newly recorded restoring procedure to be used as a common knowledge among operators. Still further, as mentioned above, since the structure of the unit operating program is made simple, the increase of a capacity of the memory for the unit operating program as well as the corresponding cost increase can be effectively prevented. It is also possible to prevent the execution time of the unit operating program from increasing.

Now, the second preferred embodiment of the present invention will be described with reference to FIGS. 22 to 24. In the second preferred embodiment, the present invention is applied to a control system for a robot unit 100.

Figure 22:
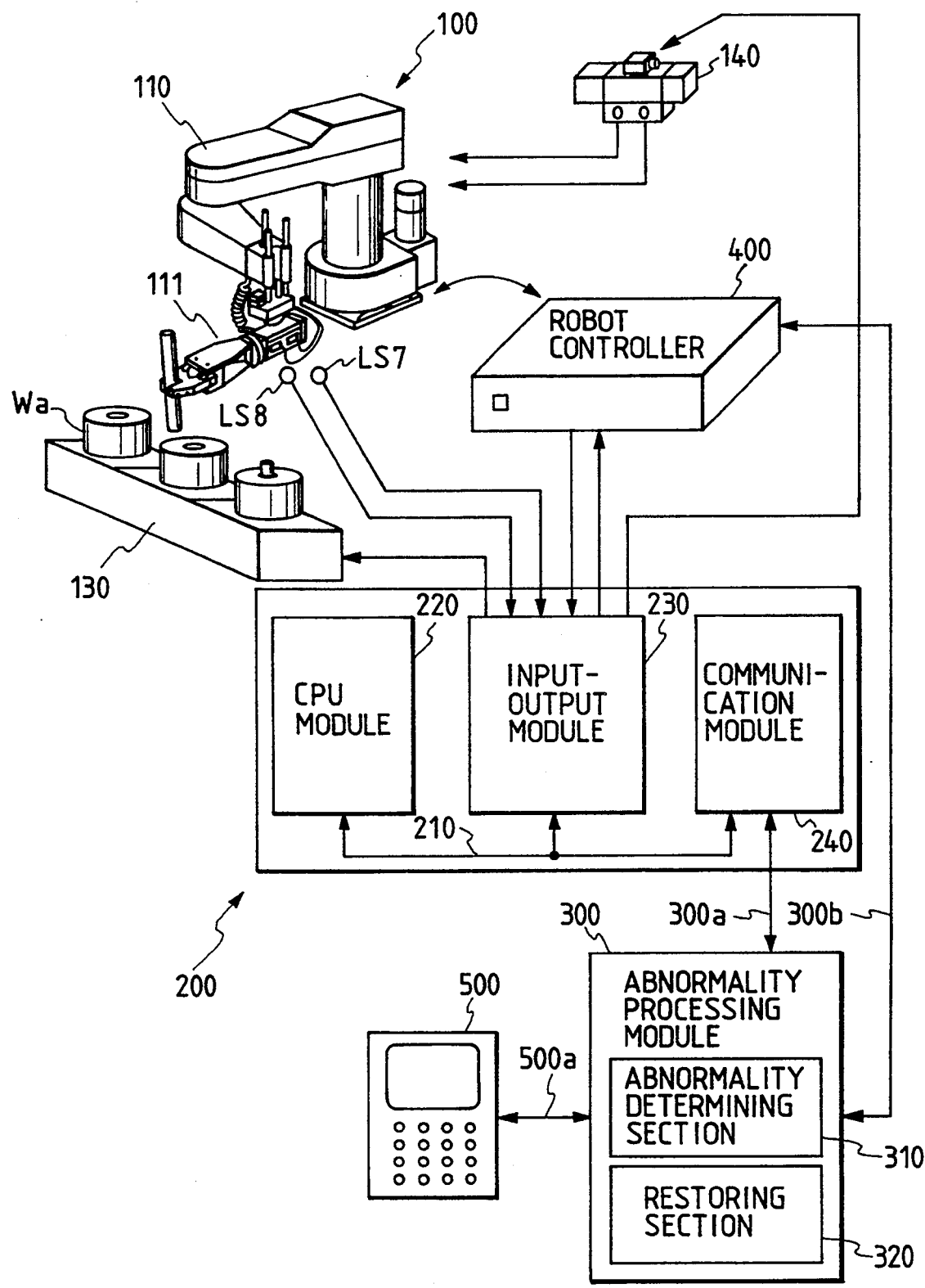
FIG. 22 is a block diagram showing a second preferred embodiment of the present invention.

In FIG. 22, the robot unit 100 includes a robot 110 which is driven by an internal motor (not shown). The robot 110 moves its robot hand 111 from an initial position toward a parts pallet 120 (FIG. 23) to chuck a rod 121 at a chucking position. It then moves the robot hand 111 with the chucked rod 121 to an unchucking position right above a work piece Wa on a conveyer 130. The rod is unchucked for placement into a hole formed in the work piece Wa, and the robotic hand 111 is returned to the initial position.

The conveyer 130 carries the work piece Wa to a position right under the unchucking position in a sequential order. The robot hand 111 is fed with pressurized air via a solenoid valve 140 from an air pressure supply (not shown) so as to perform the chucking and unchucking actions. Position sensors LS7 and LS8 are provided for respectively detecting the chucking and unchucking positions of the robot hand 111.

As shown in FIG. 22, the control system includes a PC 200, an abnormality processing module 300 connected to the PC 200 via a bus 300a, a robot controller 400 connected between the PC 200 and the abnormality processing module 300 and a control panel 500 connected to the abnormality processing module 300 via a bus 500a. The PC 200 includes a CPU module 220, an input-output module 230 and a communication module 240 which are interconnected via a bus 210.

The CPU module 220 works as a control execution section in cooperation with the robot controller 400. Specifically, the CPU module 220 performs a communication with the robot controller 400 via the input-output module 230 so as to control operations of the robot 100. The CPU module 220 receives sensor data from the position sensors LS7 and LS8 and controlled condition indicative data of the robot 100 from the robot controller 400, via the input-output module 230. In an internal memory of the CPU module 220, a control program is prestored in the form of the SFC for controlling operations of the robot controller 400, the solenoid valve 140 and the conveyer 130 at a normal operating condition of the robot unit 100.

For example, control program includes a process for instructing the robot controller 400 to start up each operation of the robot 110 and a process in which the CPU module 220 receives a completion signal indicative of completion of each operation of the robot 110 and based on these completion signals the CPU module 220 controls operations of the solenoid valve 140 for controlling the chucking and unchucking actions of the robot hand 111 and for further controlling operations of the conveyer 130 to carry the work piece Wa in a sequential order.

The abnormality processing module 300 has substantially the same structure and functions as the the abnormality processing module 20D in the first preferred embodiment. The abnormality processing module 300 includes an abnormality determining section 310 and a restoring section 320 and performs communication with the robot controller 400 via a bus 300b and with the CPU module 220 via the bus 300a, the communication module 240 and the bus 210.

The robot controller 400 controls the operations of the robot 110 and prestores in its internal memory an automatic robot operating program for controlling each operation of the robot 110 at a normal operating condition of the robot 110. The control panel 500 includes an operation panel as shown in FIG. 24 and has the substantially the same structure and functions as the control panel 30 in the first preferred embodiment except that the control panel 500 also works as a teaching pendant for programming data, such as, working positions and working procedures of the robot 110. The control panel 500 includes a section for recording and reproducing a message to the operator.

Now, the operation of the second preferred embodiment will be described with reference to a specific abnormality raised in the robot unit 100.

1. EXAMPLE OF ABNORMALITY

In this example, the rod 121 accidentally has a diameter larger than a diameter of the hole of the work piece Wa so that the rod 121 contacts around the hole not to be inserted into the hole.

2. PREPARATION OF DETERMINING ABNORMALITY

This item is substantially the same as that in the first preferred embodiment.

3. DETERMINATION OF ABNORMALITY

Though the rod 121 can not move due to the contact with the work piece Wa around the hole, the internal motor of the robot 110 tries to rotate the robot hand to a preset rotational position (corresponding to the unchucking position) according to the instruction from the robot controller 400 so that the internal motor is overloaded. Then, the robot controller detects this overload so as to stop the internal motor, that is, to stop the robot hand 111 at the current position. As a result, the unit operating program prestored in the internal memory of the CPU module 220 can not advance from the current step to the next step.

Accordingly, similar to the first preferred embodiment, the CPU module 220 continues including a number of this active step in the active step list and sending it to the abnormality determining section 310 of the abnormality processing module 300. As a result, a processing time of this step exceeds a maximum time for this step prestored in the abnormality determining section 310. The abnormality determining section 310 detects this and determines an occurrence of the abnormality at this step.

4. NOTIFICATION OF ABNORMALITY AND RECORDING OF RESTORING PROCEDURE (1) The generation of the abnormality is notified to the operator via the control panel 500. The CPU module 220 and the robot controller 400 are respectively set to the manual operation mode.

(2) The operator looks into the cause of the abnormality upon notification from the control panel 500. The operator performs the restoring operation via the control panel 500.

(3) The operator records this abnormal condition or symptom that the rod 121 is stopped due to the contact with the work piece Wa at the inlet of the hole.

(4) The operator manipulates operation buttons of the control panel 500 to restore the robot hand 111 from the abnormal condition. The operator records this restoration procedure. Time intervals between the operation steps of the restoring procedure are also recorded and reproduced when this restoring procedure is executed.

(a) The operator inputs "100" into the control panel 500 by manipulating numeral keys and depresses an upward button for the upward movement of the robot hand 111. The number "100" and the manipulation of the upward button are stored as paired data in the abnormality processing module 300. Subsequently, the robot controller 400 controls the robot 110 to raise the robot hand 111 by 100 mm according to the instruction data indicative of the number "100" and the manipulation of the upward button from the abnormality processing module 300.

Figure 23:
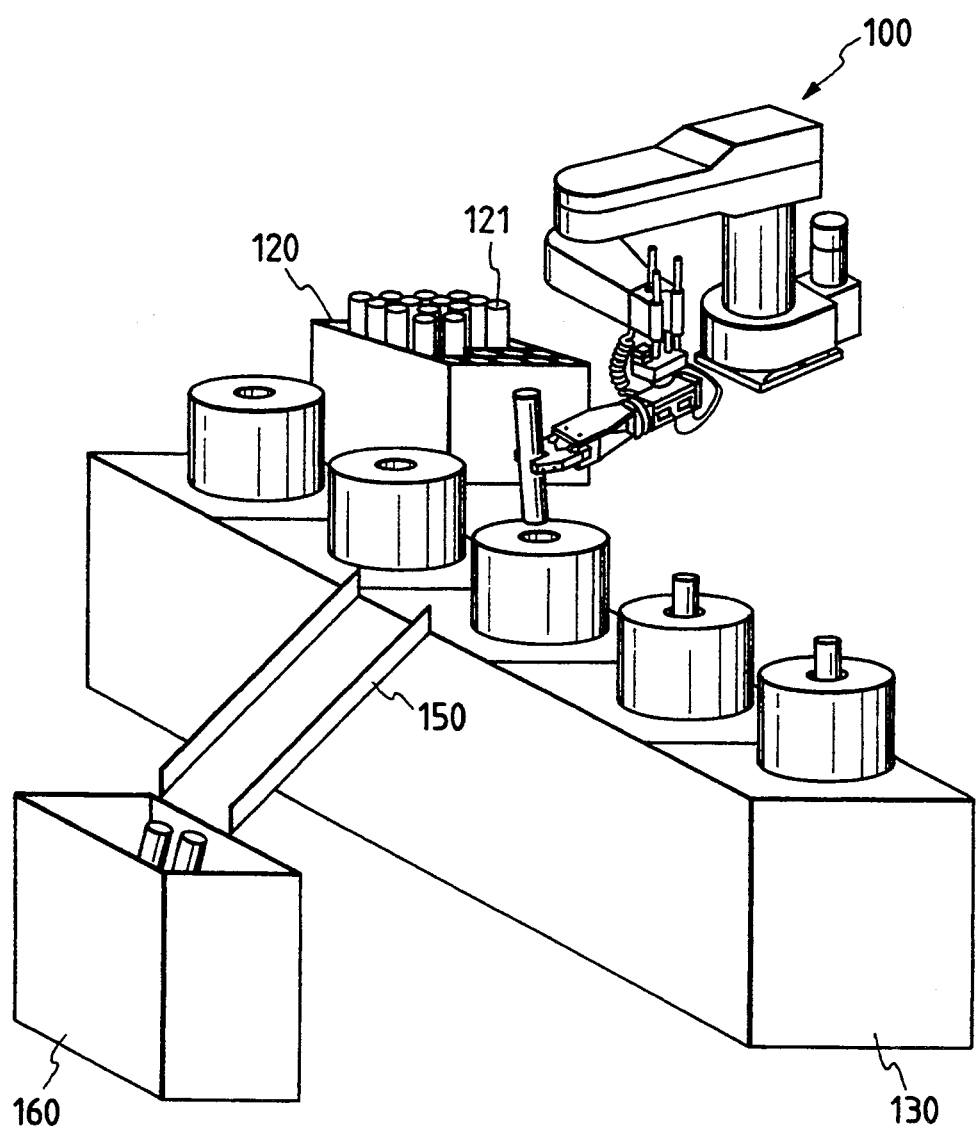
FIG. 23 is a perspective view showing a defective article discharging structure applied to a robot unit.
Figure 24:
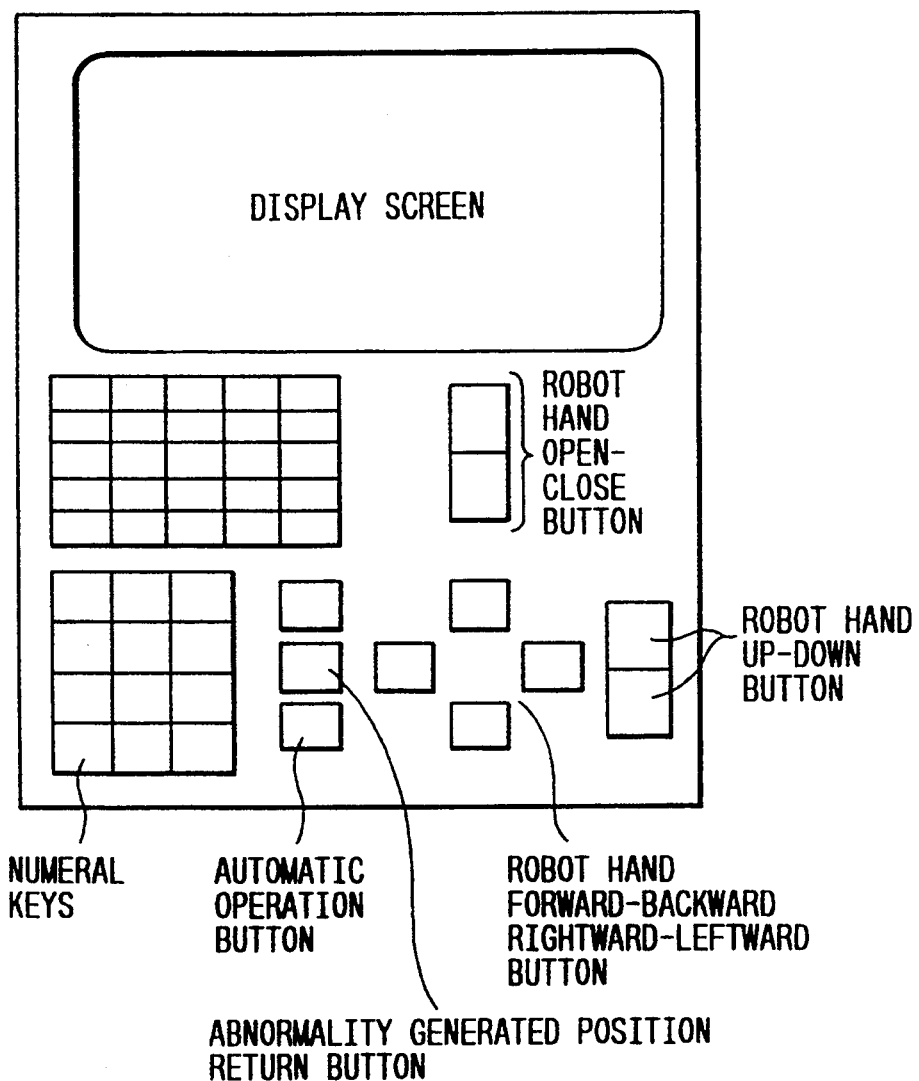
FIG. 24 is a diagram showing a control panel.

(b) The operator manipulates forward, backward, rightward and leftward buttons of the control panel 500 so as to move the robot hand 111 to a position right above a defective rod discharging chute 150 (FIG. 23). These operator's manipulations are received by the robot controller 400 as instruction data via the abnormality processing module 300 so that the robot controller 400 controls the operation of the robot 110 according to the received instruction data. A kind of the manipulated button and manipulation time and frequency are stored in the abnormality processing module 300.

(c) When the operator manipulates a hand opening button of the control panel 500, the CPU module 220 receives this operator's manipulation as instruction data via the abnormality processing module 300 and the communication module 240 and controls the operation of the solenoid valve 140 to open the robot hand 111. As a result, the rod 121 chucked by the robot hand 111 is discharged into a defective box 160 (FIG. 23) guided by the chute 150.

(d) Subsequently, the operator manipulates a hand closing button of the control panel 500, the CPU module 220 receives the operator's manipulation as instruction data via the abnormality processing module 300 and the communication module 240 and controls the operation of the solenoid valve 140 to close the robot hand 111.

(e) When the operator manipulates an abnormality generated position returning button for returning the robot hand 111 to the abnormality generated position, the instruction data stored in the abnormality processing module 300 is sent to the robot controller 400 in reverse order so that the robot controller 400 controls the robot 110 to return the robot hand 111 to the abnormality generated position.

(f) When the operator manipulates an automatic operation button of the control panel 500, the abnormality processing module 300 sets the CPU module 220 to the automatic operation mode via the communication module 240 and simultaneously sets the robot controller 400 to the automatic operation mode. Accordingly, the automatic operation of the robot unit 100 is continued thereafter.

As described above, since the robot hand 111 returns to the abnormality generated position after releasing the defective rod 121, the robot unit 100 is operated normally thereafter. As appreciated, the corresponding work piece Wa has no rod inserted therein and will be determined as being defective during the next inspection process.

4. AUTOMATIC EXECUTION OF RESTORING PROCEDURE

When the same abnormality occurs afterwards, the restoration from the abnormality is easily performed by executing the stored restoring procedure.

As appreciated, the present invention can also be applied to the control system for the robot unit 100 to provide substantially the same functions and effects as in the first preferred embodiment.

Now, a third preferred embodiment of the present invention will be described with reference to FIGS. 25 and 26.

Figure 25:
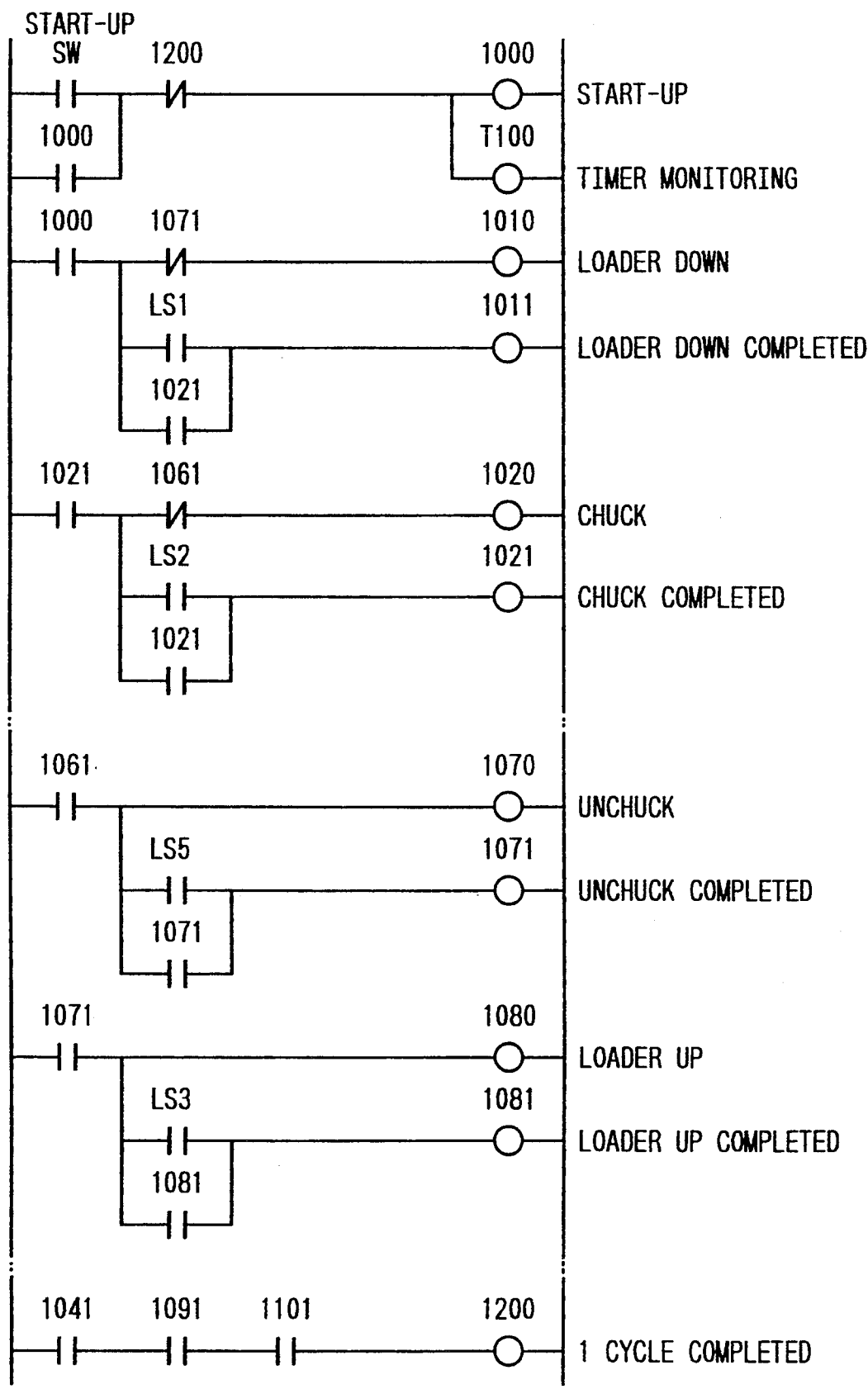
FIG. 25 is a ladder sequence diagram for controlling operations of the loader unit according to a third preferred embodiment.

In the third preferred embodiment, a unit operating program (hereinafter referred to as "second unit operating program") as shown in the form of a ladder sequence diagram in FIG. 25 is stored in the internal memory of the CPU module 20B instead of the unit operating program of FIGS. 3 and 4 in the first preferred embodiment. Further, the abnormality determining routine 60b in FIG. 8(A) is replaced by an abnormality identifying and recording routine shown in FIG. 26. Other structures are substantially the same as in the first preferred embodiment.

In FIG. 25, when the execution of the second unit operating program is started by closing a start-up switch, a monitor timer T100 starts to monitor the execution of the second unit operating program. Specifically, the monitor timer T100 starts to monitor an execution time of one cycle of the second unit operating program. When the monitor timer counts up a preset maximum time for one execution cycle of the second unit operating program, a cycle time-over signal is fed to the abnormality processing module 20D, which will be described later.

In FIG. 25, during the execution of the second unit operating program, ON-states of operation confirming addresses 1010, 1011, 1020, 1021 . . . 1070, 1071, 1080, 1081 . . . 1200 respectively show the start-up and the completion of the downward movement of the loader 12, the start-up and the completion of the chucking action of the hand 12a, the start-up and the completion of the unchucking action of the hand 12a, the start-up and the completion of the upward movement of the loader 12 and the completion of one cycle execution. Similarly, OFF-states of the operation confirming addresses 1010, 1011, 1020, 1021 . . . 1070, 1071, 1080, 1081 . . . 1200 respectively show that the loader 12 or hand 12a has not yet completed each respective process is before the start-up of the downward movement and before the completion of the downward movement, and the hand 12a is before the start-up of the chucking action, before the completion of the chucking action, before the start-up of the unchucking action and before the completion of the unchucking action, and the loader 12 is before the start-up of the upward movement and before the completion of the upward movement, and before the completion of one cycle execution.

As described above, when any one of the operation steps of the loader unit 10 is stopped due to an occurrence of abnormality, the monitor timer T100 counts up the preset maximum time so that the cycle time-over signal is fed to the abnormality processing module 20D to inform that the abnormality has been generated. A type of the abnormality is identified by a cycle stop pattern including ON or OFF states of the operation step completion addresses 1011, 1021 . . . 1071, 1081 . . . 1200. The cycle stop pattern is identified by, for example, P1, P2, P3 . . . Pn in Table 4. As appreciated, the cycle stop pattern represents ON or OFF states of the operation step completion addresses when the monitor timer T100 counts up the preset maximum time. The cycle stop pattern is temporarily stored in the internal memory of the CPU module 20B to be sent to the abnormality processing module 20D simultaneously with the cycle time-over signal.

TABLE 4

| TITLE OF STEP | STEP COMPLETION ADDRESS | CYCLE STOP PATTERN | | | | |
|---|---|---|---|---|---|---|
| | | P1 | P2 | P3 | --- | Pn |
| LOADER DOWN | 1011 | ON | ON | ON | --- | OFF |
| CHUCK | 1021 | ON | OFF | ON | --- | ON |
| UNCHUCK | 1071 | OFF | OFF | ON | --- | ON |
| LOADER UP | 1081 | OFF | OFF | OFF | --- | OFF |

Figure 26:
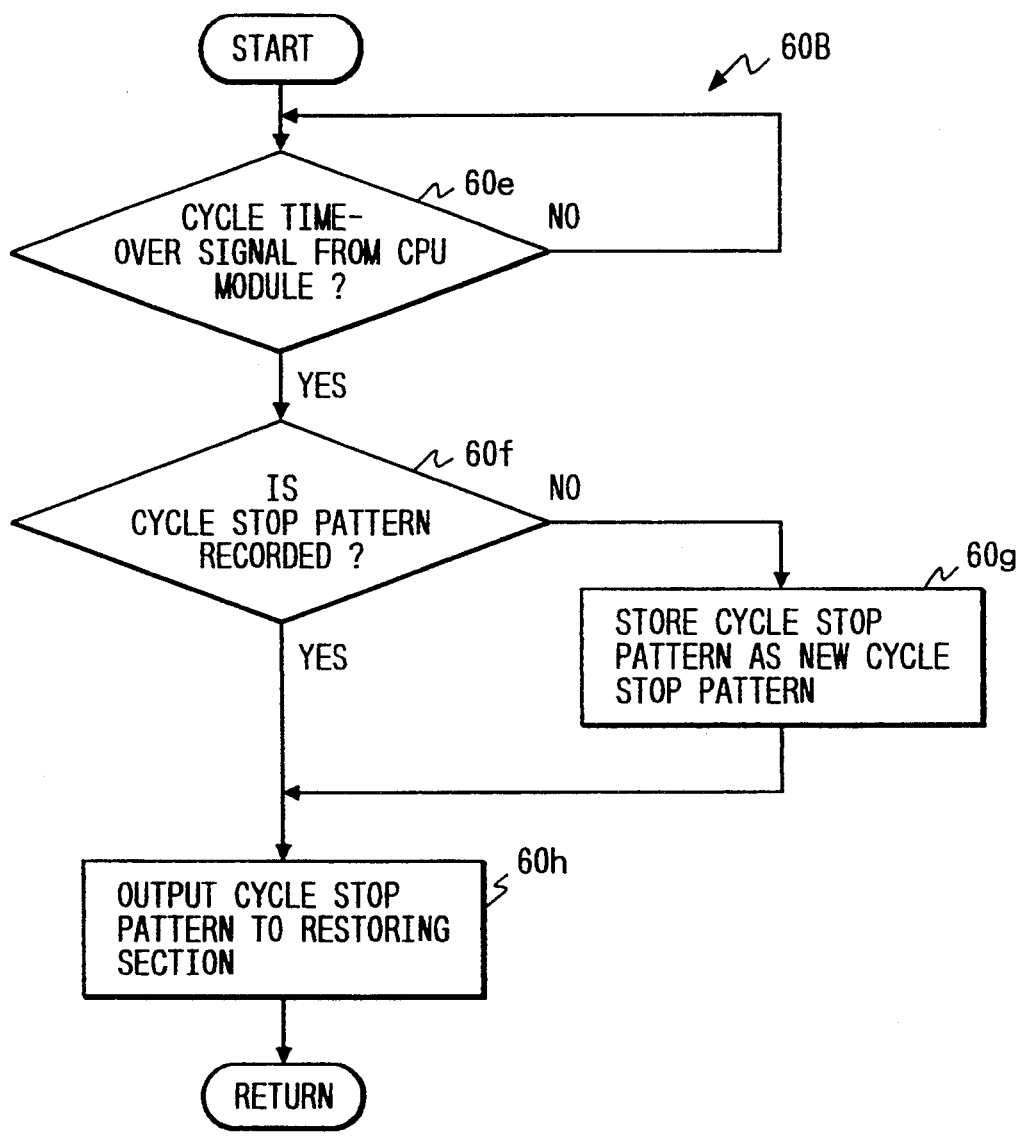
FIG. 26 is a flowchart showing an abnormality identifying and recording program.

Referring to FIG. 26, after the step 60a in FIG. 8(A) is executed, the abnormality identifying and recording routine 60B is executed instead of the abnormality determining routine 60b. At a first step 60e, it is checked whether the cycle time-over signal is received. If answer at the step 60e is YES, the routine proceeds to a step 60f which checks whether the corresponding cycle stop pattern is recorded in the restoring procedure storing section 27a of the restoring section 20D2. In the third preferred embodiment, the restoring procedure storing section 27a stores cycle stop patterns with corresponding restoring procedures.

It may be possible to use a remaining internal memory area of the abnormality processing module 20D for storing, for example, only the cycle stop patterns, i.e. without the corresponding restoring procedures, in addition to the restoring procedure storing section 27a in FIG. 7.

It may also be possible to arrange the restoring routine 60d in FIGS. 8(A), 11 and 12 to locate an abnormality occurring step based on the cycle stop pattern which is input to the restoring section 20D2 at a subsequent step 60h in FIG. 26. In this case, the data stored in the restoring procedure storing section 27a in the first preferred embodiment can be used with no change.

After the step 60f in FIG. 26, the routine goes to the step 60h where the cycle stop pattern is output to the restoring section 20D2 as described above.

If answer at the step 60f is NO, the routine proceeds to a step 60g where the cycle stop pattern is stored as a new pattern in the restoring procedure storing section 27a. As described above, this cycle stop pattern may be stored in the remaining internal memory area of the abnormality processing module 20D, in addition to the restoring procedure storing section 27a. Subsequently, the routine proceeds to the step 60h.

As appreciated from the foregoing description, in the third preferred embodiment, the automatic execution of the restoring procedure and the recording of the manual operator's input of the restoring procedure can be attained in substantially the same manner as in the first preferred embodiment. Further, since the maximum time data stored in the maximum time recording section 22a in the first preferred embodiment and the corresponding comparing action are replaced by the monitor timer T100 and the cycle over-time signal, the system can be made less complicated.

Now, a modification of the third preferred embodiment will be described with reference to FIGS. 27 and 28.

Figure 27:
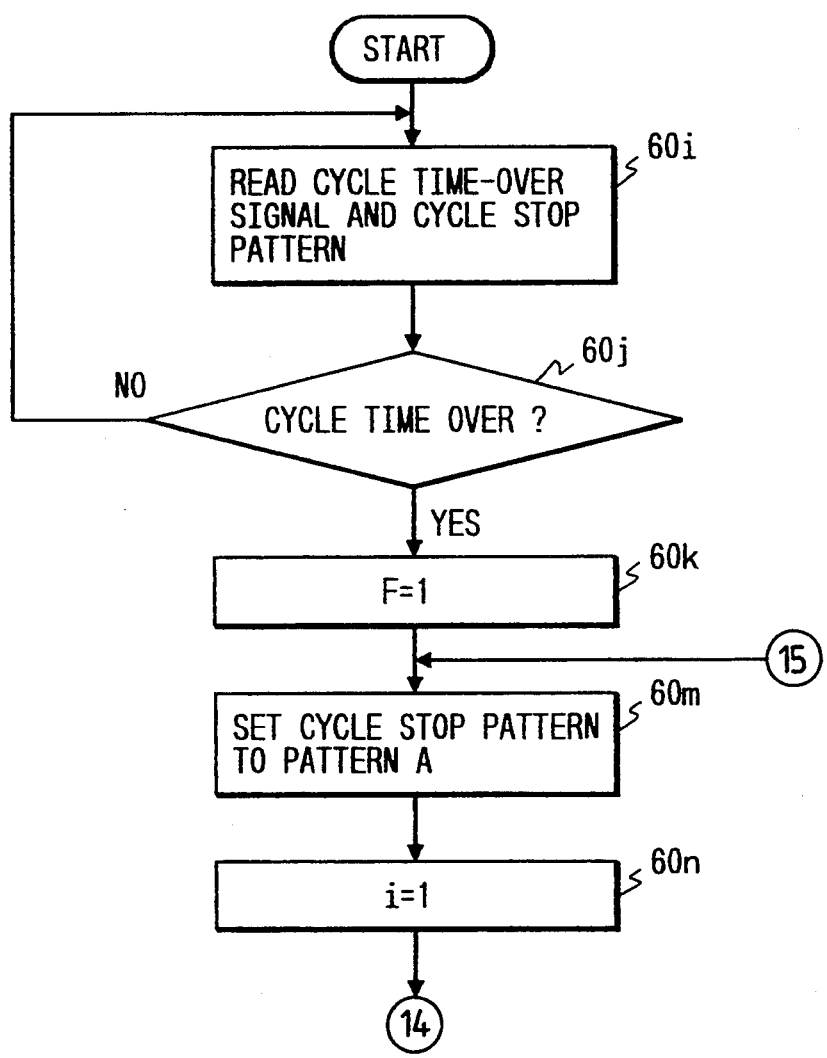
FIGS. 27 and 28 show a flowchart of an abnormality identifying and recording program according to a modification of the third preferred embodiment.
Figure 28:
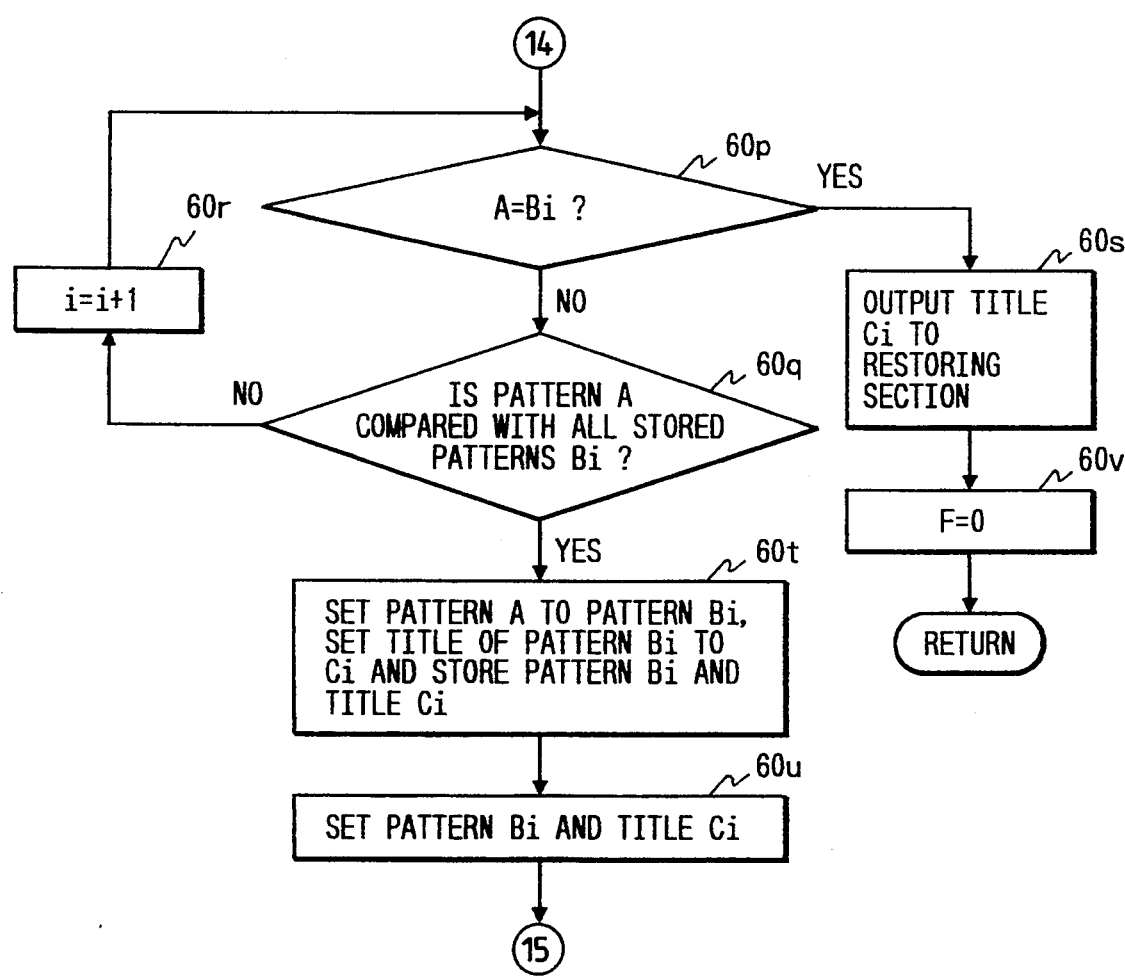

In this modification, the abnormality identifying and recording routine 60B in FIG. 26 is replaced by an abnormality identifying and recording routine shown in FIGS. 27 and 28. Other structures are substantially the same as those in the third preferred embodiment.

Referring to FIGS. 27 and 28, after the execution of the step 60a in FIG. 8(A), a first step 60i reads out the cycle time-over signal and the cycle stop pattern. A subsequent step 60j checks whether cycle time over is detected. If answer at the step 60j is YES, then the routine goes to a step 60k where a flag is set to 1. Subsequently, at a step 60m, the cycle stop pattern read at the step 60i is set to A. Then, a step 60n sets i=1. Subsequently, at steps 60p, 60q and 60r, the pattern A is compared with all stored patterns Bi. If answer at the step 60p is NO and answer at the step 60q is YES, then the routine goes to a step 60t where the pattern A is set to Bi, a title of the pattern Bi is set to Ci, and the pattern Bi and the title Ci are stored in the restoring procedure storing section 27a. Similar to the third embodiment, the pattern Bi and the title Ci may also be stored in the remaining internal memory area of the abnormality processing module 22D in addition to the restoring procedure storing section 27a. Subsequently, at a step 60u, the pattern Bi and the title Ci are set for a further processing at the step 60m.

Referring back to the step 60p, if answer at the step 60p becomes YES, then the routine proceeds to a step 60s where the title Ci is output to the restoring section 22D2 for executing the restoring routine 60d in FIG. 8(A). Subsequently, at a step 60v, the flag is set to zero for a next execution of this routine.

As appreciated from the foregoing description, this modification works similar to the third preferred embodiment.

It is to be understood that this invention is not to be limited to the preferred embodiments and modifications described above, and that various changes and modifications may be made without departing from the spirit and scope of the invention as defined in the appended claims.

Figure 29A:
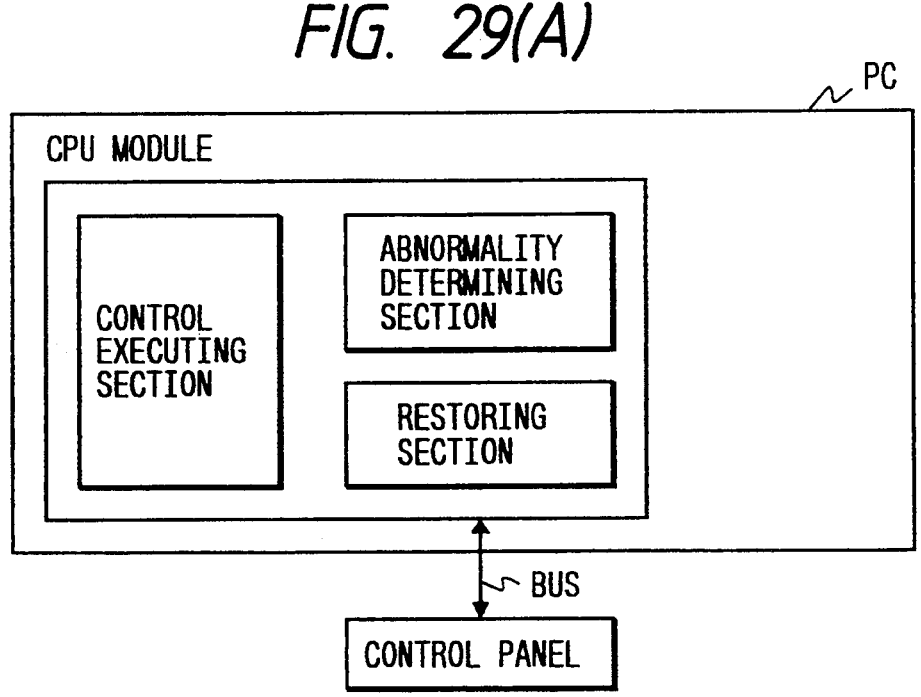
FIG. 29A is a block diagram showing a modification of the structure in FIG. 1, wherein the abnormality processing module is provided in the CPU module.
Figure 29B:
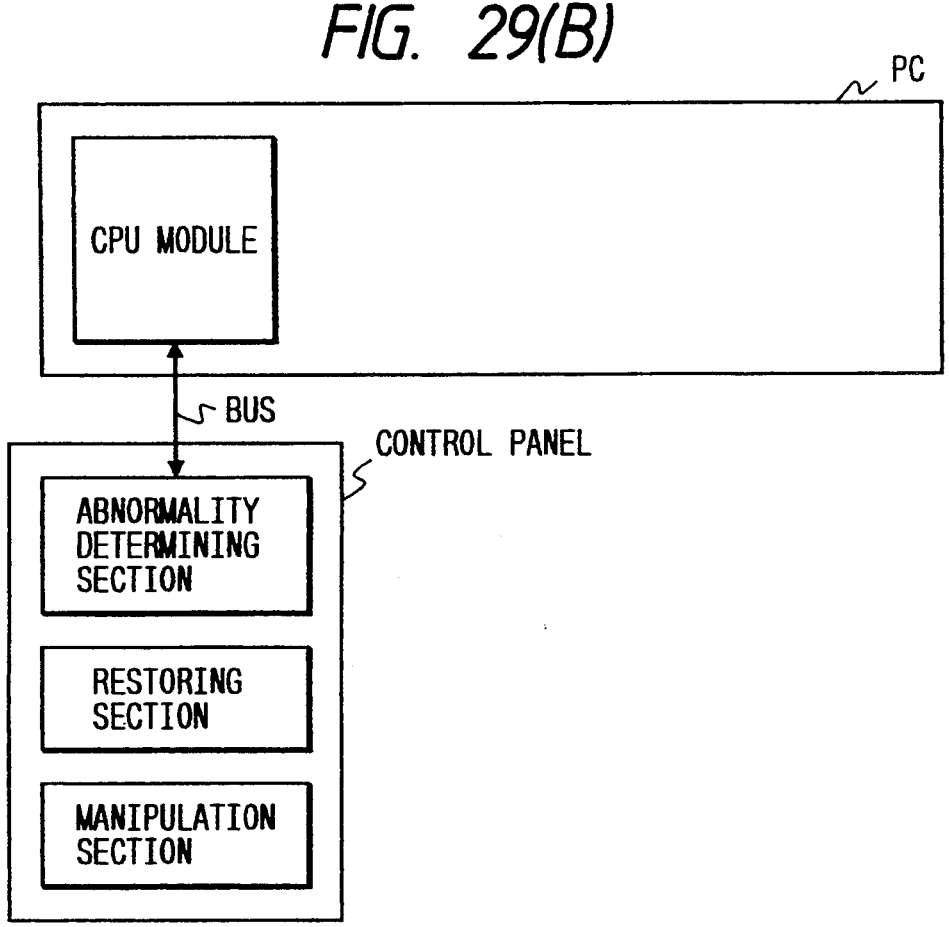
FIG. 29B is a block diagram showing a modification of the structure in FIG. 1, wherein the abnormality processing module is provided in the control panel.

For example, the abnormality processing module 20D in FIG. 1 may be provided in the CPU module as shown in FIG. 29(A) or in the control panel 30 as shown in FIG. 29(B). It is to be noted that any module arrangement is possible as long as it works effectively and is never considered to be limitative of the present invention.

What is claimed is:

1. A system for restoring a controlled unit from an abnormal condition, comprising:

storing means for storing a plurality of possible abnormal conditions and corresponding restoring procedures for said controlled unit;

determining means for determining whether an actually generated abnormal condition matches one of said stored possible abnormal conditions;

restoring means for restoring said controlled unit from said abnormal condition based on said stored restoring procedure corresponding to said one of said stored possible abnormal conditions when said determining means determines that said actually generated abnormal condition matches with said one of said stored possible abnormal conditions; and input means for inputting said actually generated abnormal condition and its corresponding restoring procedure to be stored in said storing means when said determining means determines that said actually generated abnormal condition disagrees with any of the stored abnormal conditions, where said inputted restoring procedure reflects a time required for inputting said inputted restoring procedure through said input means.

2. A system for restoring a controlled unit from an abnormal condition, comprising:

storing means for storing a plurality of possible abnormal conditions and corresponding restoring procedures for said controlled unit;

determining means for determining whether an actually generated abnormal condition matches one of said stored possible abnormal conditions;

restoring means for restoring said controlled unit from said abnormal condition based on said stored restoring procedure corresponding to said one of said stored possible abnormal conditions when said determining means determines that said actually generated abnormal condition matches with said one of said stored possible abnormal conditions; and input means for inputting said actually generated abnormal condition and its corresponding restoring procedure to be stored in said storing means when said determining means determines that said actually generated abnormal condition disagrees with any of the stored abnormal conditions, where said inputted restoring procedure comprises a plurality of operations performed by said controlled unit, and wherein time storing means are provided for storing a waiting time for each of said operations, said waiting time being determined by a time required for respectively inputting each of said operations through said input means.

3. A sequence control system in which a sequence program is written in the form of a sequential function chart having a plurality of numbered steps, said sequence control system comprising:

state output means having step output means for outputting a number corresponding to a currently executed step in said sequence program, and time output means for outputting a current time;

abnormality determining means including:

time storing means for prestoring a maximum execution time for each step corresponding to each step number of said sequence program, state storing means for storing a step execution starting time comprising said step number received from said step output means and said current time received from said time output means, and determining means, operative in response to said step number output from said state output means matching one of said stored step numbers, for calculating a difference between said current time output from said time output means and said stored step execution starting time corresponding to said matching stored step number, and for determining abnormality of said system when said calculated difference exceeds said prestored maximum execution time corresponding to said matching step number; and restoring means for executing an automatic restoring procedure corresponding to said matching step number when said determining means determines said abnormality of said system.

4. The sequence control system as set forth in claim 3, wherein an operator records a manual restoring operation which is executed as said automatic restoring procedure, and wherein said manual restoring operation is recorded corresponding to said matched step number.

5. The sequence control system as set forth in claim 3, wherein an operator records a manual restoring operation including an operator message which is executed as said automatic restoring procedure, and wherein said manual restoring operation is recorded corresponding to said matched step number.

6. A sequence control system in which a sequence program is written in the form of a ladder sequence diagram, said sequence control system comprising:

state output means having operation storing means for storing conditions indicating which steps in said sequence program have been completed, said state output means outputting a state pattern based on said conditions;

abnormality determining means for determining a type of abnormality of the system based on said state pattern output by said state output means; and restoring means for executing an automatic restoring procedure corresponding to said abnormality type determined by said abnormality determining means.

7. The sequence control system as set forth in claim 6, wherein said operation storing means stores said condition for each of the steps as an ON or OFF state, and wherein said abnormality determining means determines said type of the abnormality based on a pattern of said ON and OFF states.

8. The sequence control system as set forth in claim 6, wherein timer means are provided for monitoring an execution time of one cycle of said sequence program, and wherein said state output means outputs said state pattern when said monitored execution time exceeds a preset maximum execution time.

9. The sequence control system as set forth in claim 6, wherein timer means are provided for monitoring an execution time of one cycle of said sequence program, wherein said state output means outputs said state pattern when said monitored execution time exceeds a preset maximum execution time, wherein said abnormality determining means further includes pattern storing means for storing a plurality of state patterns which correspond to types of system abnormalities, and wherein said abnormality determining means determines said type of the abnormality when said state pattern output by said state output means matches one of said stored state patterns.

10. The sequence control system as set forth in claim 6, wherein timer means are provided for monitoring an execution time of one cycle of said sequence program, wherein said state output means outputs said state pattern when said monitored execution time exceeds a preset maximum execution time, wherein said abnormality determining means further includes pattern storing means for storing a plurality of state patterns which correspond to types of system abnormalities and a plurality of restoring procedures corresponding to said stored state patterns, wherein said abnormality determining means determines said type of the abnormality when said state pattern output by said state output means matches one of said stored state patterns, and wherein said automatic restoring procedure executed by said restoring means corresponding to said matched state pattern output by said state output means.

* * * * *